(12) United States Patent
Jain et al.

(10) Patent No.: US 6,469,103 B1
(45) Date of Patent: *Oct. 22, 2002

(54) NARROW MWD, COMPOSITIONALLY OPTIMIZED ETHYLENE INTERPOLYMER COMPOSITION, PROCESS FOR MAKING THE SAME AND ARTICLE MADE THEREFROM

(75) Inventors: Pradeep Jain; Lonnie G. Hazlitt; Jacquelyn A. deGroot; Kenneth W. Anderson, all of Lake Jackson, TX (US)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,948

(22) Filed: Sep. 18, 1998

Related U.S. Application Data

(60) Provisional application No. 60/059,555, filed on Sep. 19, 1997.

(51) Int. Cl.[7] .................. C08L 23/06; C08L 23/08; C08F 4/44
(52) U.S. Cl. .................. 525/240; 525/242; 526/160; 526/161; 526/348.6
(58) Field of Search .................. 525/240, 242, 525/245, 247, 249, 268, 251; 526/160, 348.2, 943

(56) References Cited

U.S. PATENT DOCUMENTS

| 4,243,619 | A |   | 1/1981  | Fraser et al. |         |
|-----------|---|---|---------|---------------|---------|
| 5,210,142 | A |   | 5/1993  | Kale et al.   |         |
| 5,272,236 | A |   | 12/1993 | Lai et al.    |         |
| 5,278,272 | A |   | 1/1994  | Lai et al.    |         |
| 5,370,940 | A |   | 12/1994 | Hazlitt et al.|         |
| 5,376,439 | A |   | 12/1994 | Hodgson et al.|         |
| 5,530,065 | A | * | 6/1996  | Farley et al. | 525/240 |
| 5,874,139 | A | * | 2/1999  | Bosiers et al.| 428/35.2|
| 5,972,444 | A |   | 10/1999 | Patel et al.  |         |

FOREIGN PATENT DOCUMENTS

| EP | 0 572 034 A2   | 1/1993  | C08F/210/02 |
| EP | 0 575 123 A2   | 12/1993 | C08L/23/08  |
| WO | WO 9313143 A1  | 7/1993  |             |
| WO | WO 9409060 A1  | 4/1994  |             |
| WO | 94/17112       | 8/1994  | C08F/210/02 |
| WO | 94/25523       | 11/1994 | C08L/23/16  |
| WO | WO 9515851 A1  | 6/1995  |             |
| WO | WO 9530713 A1  | 11/1995 |             |
| WO | WO 9530714 A1  | 11/1995 |             |
| WO | 96/07680       | 3/1996  | C08F/210/16 |
| WO | WO 9612762 A1  | 5/1996  |             |
| WO | WO 9635750 A1  | 11/1996 |             |
| WO | WO 9730111 A1  | 8/1997  |             |
| WO | WO 9821274 A1  | 5/1998  |             |
| WO | WO 9821276 A1  | 5/1998  |             |
| WO | WO 9903902 A1  | 1/1999  |             |
| WO | WO 9914271 A1  | 3/1999  |             |

OTHER PUBLICATIONS

U.S. patent application Ser. No. 08/880006, DeKunder et al., filed on Jun. 20, 1997.
U.S. patent application Ser. No. 08/966465, Van Dun et al., filed on Nov. 06, 1997.
U.S. patent application Ser. No. 09/943853, Anderson et al., filed Aug. 31, 2001.

* cited by examiner

Primary Examiner—Donald R. Wilson
Assistant Examiner—R. Harlan

(57) ABSTRACT

The present invention pertains to an ethylene interpolymer composition characterized as having a narrow molecular weight distribution (MWD) and optimized compositional uniformity, a process for making such a composition and a fabricated article made from such composition. The novel composition is characterized as having at least two polymer components, the first component having an ATREF peak temperature, $T_{peak1}$ and a viscosity average molecular weight, $M_{v1}$, and the second component having an ATREF peak temperature, $T_{peak2}$, and a viscosity average molecular, $M_{v2}$, wherein the temperature differential between $T_{peak2}$ and $T_{peak1}$ decreases with increased composition density and $M_{v1}/M_{v2}$ is less than or equal to 1.2. The novel composition is further characterized as having a $M_w/M_n$ of less than or equal to 3.3 as determined by gel permeation chromatography, an $I_{10}/I_2 > 6.6$, and a composition density less than 0.945 gram/cubic centimeter. The novel composition exhibits high, balanced toughness properties, good processibility and surprisingly improved optical properties and is particularly well-suited for use in applications such as lamination films trash can liners and heavy duty shipping bags, especially as a blown film.

16 Claims, 4 Drawing Sheets

NARROW MWD, COMPOSITIONALLY OPTIMIZED ETHYLENE INTERPOLYMER COMPOSITION, PROCESS FOR MAKING THE SAME AND ARTICLE MADE THEREFROM

CROSS REFERENCE TO RELATED APPLICATIONS

This application is a continuation-in-part application of U.S. provisional application No. 60/059,555, filed Sep. 19, 1997, now abandoned, the disclosure of which is incorporated herein, in its entirety, by reference.

FIELD OF INVENTION

This invention relates to an ethylene interpolymer composition comprised of at least two dominant polymer components, wherein the composition is characterized as having a relatively narrow molecular weight distribution (MWD) and a variably optimized compositional uniformity. The invention also relates to a process for making such a composition and fabricated articles made from the novel composition. The novel composition exhibits improved and balanced toughness properties, good processibility and improved optical properties and is particularly well-suited for use in applications such as trash can liners, lamination films, oriented shrink film and bags, overwrap films, and heavy duty shipping bags, especially as blown films.

BACKGROUND OF THE INVENTION

In the manufacture of ethylene interpolymers such as ethylene interpolymerized with at least one unsaturated comonomer, a number of polymerization methods and procedures are known. For example, single site and constrained geometry catalyst systems have been disclosed for manufacturing olefin polymers with high compositional uniformity and relatively narrow molecular weight distributions.

Variations in the reactor systems used to manufacture ethylene interpolymers are also known. For example, while single site catalysis systems are disclosed to provide compositionally uniform, narrow MWD products (e.g., EXACT plastomers supplied commercially by Exxon Chemical Corporation) when employed in a high pressure polymerization system and conversely products with decreased homogeneity with respect to the short chain branching distribution and a broader molecular weight distribution (e.g., EXCEED resins supplied commercially by Exxon Chemical Corporation) when employed in a low pressure gas phase polymerization process.

While the art is replete with various products and manufacturing techniques, the known range of manufacturing capabilities still do not permit the manufacturing of ethylene interpolymer compositions characterized as having high, balanced toughness properties, good processability and improved optical properties. That is, known ethylene interpolymer compositions (either as single reactor products, multiple reactor products or polymer blends) do not exhibit the desired balance of good processability (i.e., sufficient extrusion processing characteristics to avoid, for example, excessively high extruder amperage during blown film fabrication with sufficient melt strength to permit, for example, good bubble stability to maximize output rates); balanced tear resistance; high and balanced tensile properties; high dart impact resistance; and low film haze.

The traditional polyethylene solution for achieving improved toughness properties involves manufacturing products with narrow molecular weight distributions as broad molecular weight distributions are known to yield reduced toughness properties. Beyond providing a narrow molecular weight distribution, linear polyethylenes are known to provide improved toughness properties relative to highly branched LDPE. Further, beyond merely a narrow molecular weight distribution and a linear polymer backbone, compositional uniformity has been offered for enhanced toughness properties. However, while the combination of a narrow molecular weight distribution, a linear polymer backbone and compositional uniformity may provide enhanced toughness, this combination of polymer properties invariably provides poor processability (e.g., excessively high extruder amperage).

In contrast to the combination of a narrow molecular weight distribution, increased compositional uniformity and a linear polymer backbone, to achieve the balance of good processability (i.e., resistance to melt fracture and improved melt strength) and toughness properties, Lai et al. disclose in U.S. Pat. No. 5,272,236, the disclosure of which is incorporated by reference, substantially linear ethylene polymers characterized as having narrow molecular weight distribution, high compositional uniformity and long chain branching.

Other proposed solutions for achieving balanced properties include polymer blends such as those disclosed by Kale et al. in U.S. Pat. No. 5,210,142 and Hazlitt et al. in U.S. Pat. No. 5,370,940, the disclosures of both of which are incorporated by reference. However, while such polymer blends exhibit good handling properties and processability, known polymer blends inevitably exhibit insufficient compositional uniformity to provide the desired balanced toughness properties.

Fraser et al. in U.S. Pat. No. 4,243,619 disclose a process for making film from a narrow molecular weight distribution ethylene/α-olefin copolymer composition prepared by a Ziegler catalyst system which is said to exhibit good optical and mechanical properties.

Research Disclosure No. 310163 (Anonymous) teaches blends comprising a Ziegler-Natta catalyzed ethylene copolymer and a metallocene catalyzed ethylene copolymer fabricated as cast films have improved optical, toughness, heat sealability, film blocking and unwind noise properties when compared to metallocene catalyzed ethylene polymers alone. However, the improvements in tear and ultimate tensile are not shown to be balanced.

Similarly, Research Disclosure No. 37644 (Anonymous) teaches blends of Ziegler-Natta catalyzed resins and resins made using single site catalysis system exhibit superior TD tear resistance and superior MD ultimate tensile properties. Hodgson et al. in U.S. Pat. No. 5,376,439 also describe film from a polymer blend which is said to have excellent elongation, tensile and impact properties.

WO 98/26000, the disclosure of which is incorporated herein by reference, discloses cast films prepared from interpolymer compositions comprising a substantially linear ethylene/α-olefin interpolymer and a heterogeneous interpolymer wherein the composition has an $I_{10}/I_2$ value of <10 and is characterized as having a log viscosity at 100 rad/s $\leq$ 4.43–0.8×log($I_2$) or a log relaxation time>−1.2−1.3×log (12). The reported inventive examples have an average $I_2$ of 3.65 g/10 minutes and an average $I_{10}/I_2$ of 7.07 and range in $M_w/M_n$ from about 2.14 to about 3.4 and in composition density from about 0.9118 g/cm$^3$ to about 0.9188 g/cm$^3$. The reported $M_{v1}/M_{v2}$ ratios and TREF peak temperature differentials for inventive examples range from about 0.577 to about 0.728 and from about 17 to about 24° C., respectively. However, TREF peak temperature differentials are not shown to vary with composition density and no density differential between the component polymers or component molecular weights are reported in WO 98/26000, nor is any property balance or optical improvement discussed or reported.

Hence, in spite of the above disclosures, no known ethylene interpolymer composition exhibits high, balanced toughness, good processability and good optical properties. As such, there remains a need for an improved ethylene interpolymer composition, especially for use in blown film applications. There is also a need for a process for making an improved ethylene interpolymer composition with the desired property balance. There is also a need for a process for making an improved ethylene interpolymer composition wherein the process involves polymerization using multiple reactors and the process is characterized by improved flexibility such that a broad range of product molecular weights and/or densities can be economically manufactured. There is also a need for a blown film with the desired property balance. These and other objects will become apparent from the detailed description of the present invention provided herein below.

SUMMARY OF THE INVENTION

We have discovered a multicomponent ethylene interpolymer composition which is characterized by a relatively narrow molecular weight distribution and a variably optimized compositional distribution with respect to its composition density and short chain branching distribution or fractional component crystallinity. The broad aspect of the invention is a polymer composition comprising ethylene interpolymerized with at least one unsaturated comonomer, wherein the composition is characterized as having:

a) a $M_w/M_n$ of less than or equal to 3.3, as determined by gel permeation chromatography (GPC), b) an $I_{10}/I_2$ in the range of from greater than 6.6 to about 8.2, as determined in accordance ASTM D-1238, Condition 190° C./2.16 kg and Condition 190° C./10 kg, c) a composition density less than 0.945 gram/cubic centimeter, as determined according to ASTM-792, d) at least two polymer components, the first component having a first viscosity average molecular weight, $M_{v1}$, and the second component having a second viscosity average molecular, $M_{v2}$, wherein $M_{v1}/M_{v2}$ is less than or equal to 1, as determined using ATREF-DV, and e) a first ATREF peak temperature, $T_{peak1}$ and a second ATREF peak temperature, $T_{peak2}$, corresponding to the at least two components and as determined using analytical temperature rising elution fraction (ATREF), wherein the temperature differential between $T_{peak2}$ and $T_{peak1}$, $\Delta T$, decreases with increased composition density such that $\Delta T$ is less than 23° C. at composition densities greater than or equal to 0.926 g/cm³ and greater than 13° C. at composition densities less than or equal to 0.92 g/cm³.

A second aspect of the invention is a polymer composition comprising ethylene interpolymerized with at least one unsaturated comonomer, wherein the composition is characterized as having:

a) a $M_w/M_n$ of less than or equal to 3.3, as determined by gel permeation chromatography (GPC), b) an $I_{10}/I_2$ ratio greater than 6.6, as determined in accordance ASTM D-1238, Condition 190° C./2.16 kg and Condition 190° C./10 kg, c) a composition density less than 0.945 gram/cubic centimeter, as determined according to ASTM-792, d) at least two polymer components, the first component having a first viscosity average molecular weight, $M_{v1}$, and the second component having a second viscosity average molecular, $M_{v2}$, wherein $M_{v1}/M_{v2}$ is in the range of from about 0.6 to about 1.2, as determined using ATREF-DV, and e) a first ATREF peak temperature, $T_{peak1}$ and a second ATREF peak temperature, $T_{peak2}$ corresponding to the at least two components and as determined using analytical temperature rising elution fraction (ATREF), wherein the temperature differential between $T_{peak2}$ and $T_{peak1}$, $\Delta T$, is equal to or less than the product of the equation:

$$\Delta T = [5650.842 \times \rho^2] - [11334.5 \times \rho] + 5667.93$$

wherein $\Delta T$ is in degrees Celsius and $\rho$ is composition density in g/cm³.

In an especially preferred embodiment, the composition is further characterized as having:

(e) a $\Delta T$ which is in the range of from about equal to or greater than the product of the equation:

$$\Delta T_{lower} = [5650.842 \times \rho^2] - [11334.5 \times \rho] + 5650.27$$

to about equal to or less than the product of the equation:

$$\Delta T_{Upper} = [5650.842 \times \rho^2] - [11334.5 \times \rho] + 5667.93$$

where $\Delta T$ is in degrees Celsius and $\rho$ is composition density in g/cm³, and (f) a density differential between the density of the second and first polymer component of less than or equal to 0.028 g/cm³.

Another aspect of the invention is a process for making an ethylene polymer composition comprised of ethylene interpolymerized with at least one unsaturated comonomer and characterized as having:

a) a $M_w/M_n$ of less than or equal to 3.3, as determined by gel permeation chromatography (GPC), b) an $I_{10}/I_2$ in the range of from greater than 6.6 to about 8.2, as determined in accordance ASTM D-1238, Condition 190° C./2.16 kg and Condition 190° C./10 kg, c) a composition density less than 0.945 gram/cubic centimeter, as determined according to ASTM-792, d) at least two polymer components, the first component having a first viscosity average molecular weight, $M_{v1}$, and the second component having a second viscosity average molecular, $M_{v2}$, wherein $M_{v1}/M_{v2}$ is less than or equal to 1, as determined using ATREF-DV, and e) a first ATREF peak temperature, $T_{peak1}$ and a second ATREF peak temperature, $T_{peak2}$, corresponding to the at least two components and as determined using analytical temperature rising elution fraction (ATREF), wherein the temperature differential between $T_{peak2}$ and $T_{peak1}$, $\Delta T$, decreases with increased composition density such that $\Delta T$ is less than 23° C. at composition densities greater than or equal to 0.926 g/cm³ and greater than 13° C. at composition densities less than or equal to 0.92 g/cm³, the process comprising continuously operating at least two polymerization reactors.

The third aspect of the invention is a fabricated article comprising an ethylene interpolymer composition which comprises ethylene interpolymerized with at least one unsaturated comonomer and is characterized as having:

a) a $M_w/M_n$ of less than or equal to 3.3, as determined by gel permeation chromatography (GPC), b) an $I_{10}/I_2$ in the range of from greater than 6.6 to about 8.2, as determined in accordance ASTM D-1238, Condition 190° C./2.16 kg and Condition 190° C./10 kg, c) a composition density less than 0.945 gram/cubic centimeter, as determined according to ASTM-792, d) at least two polymer components, the first component having a first viscosity average molecular weight, $M_{v1}$, and the second component having a second viscosity average molecular, $M_{v2}$, wherein $M_{v1}/M_{v2}$ is less than or equal to 1, as determined using ATREF-DV, and e) a first ATREF peak temperature, $T_{peak1}$ and a second ATREF peak temperature, $T_{peak2}$, corresponding to the at least two components and as determined using analytical temperature rising elution fraction (ATREF), wherein the temperature differential between $T_{peak2}$ and $T_{peak1}$, ΔT, decreases with increased composition density such that ΔT is less than 23° C. at composition densities greater than or equal to 0.926 g/cm³ and greater than 13° C. at composition densities less than or equal to 0.92 g/cm³.

DETAILED DESCRIPTION OF THE INVENTION

We have discovered that substantial distinctiveness between dominant polymer components of an ethylene interpolymer composition results in unbalanced, reduced toughness properties when the composition is converted into film form. In particular, we discovered that, surprisingly, a composition having a relatively narrow molecular weight distribution and comparatively high molecular weight can be manufactured with high, balanced toughness properties while maintaining good extrusion processability and optical properties providing its compositional distribution as determined by analytical temperature rising elution fractionation (ATREF) is appropriately optimized.

Figure 1:
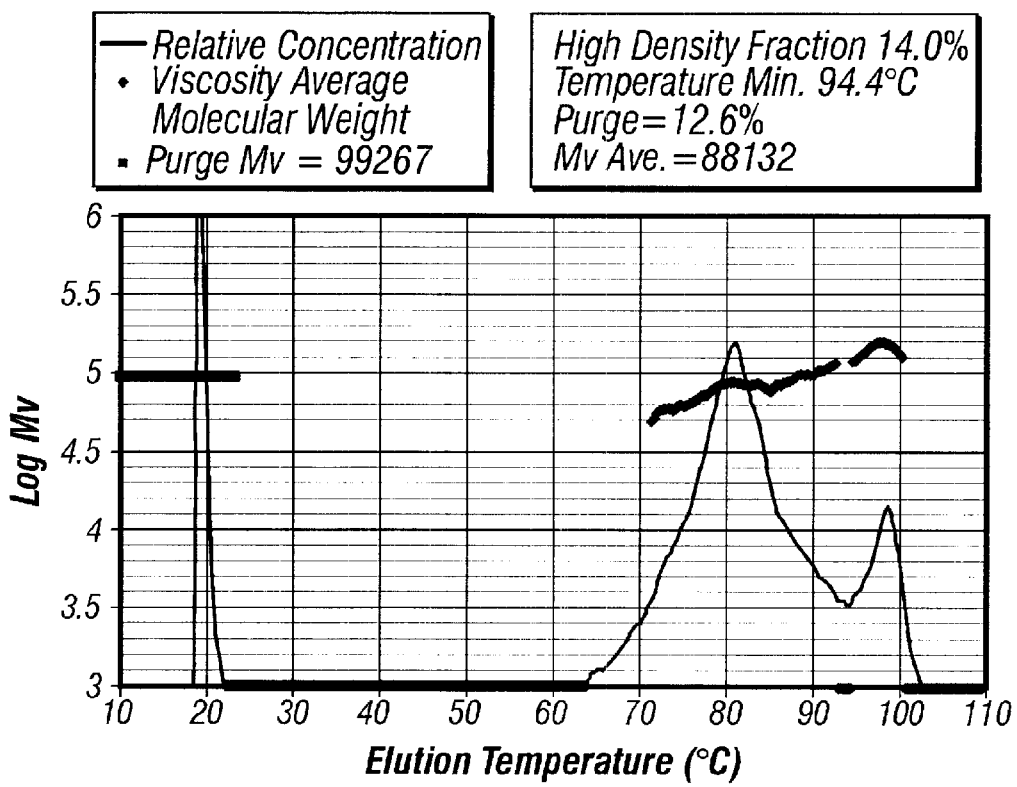
FIG. 1 is an ATREF-DV curve showing the short chain branching distribution as related to the viscosity-average molecular weight ($M_v$) for Inventive Example 1 where ATREF-DV denotes analytical temperature rising elution fractionation coupled with a differential viscometer for viscosity average molecular weight determination as a function of elution temperature.
Figure 2:
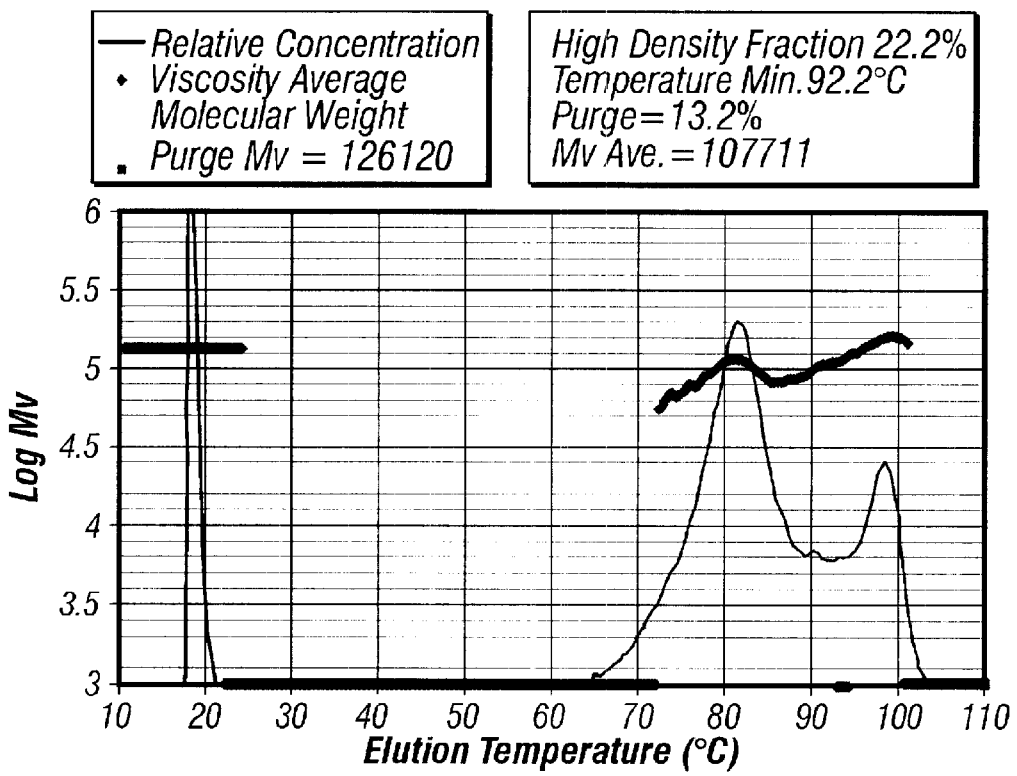
FIG. 2 is an ATREF-DV curve showing the short chain branching distribution as related to the viscosity-average molecular weight ($M_v$) for Inventive Example 2.
Figure 3:
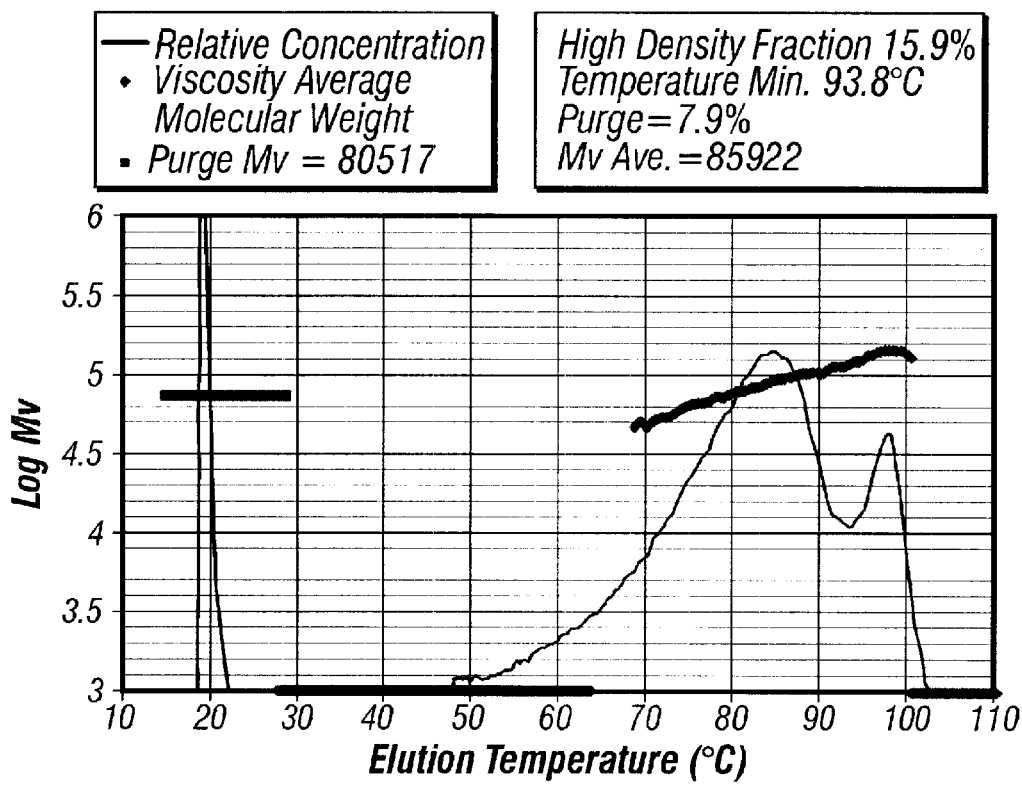
FIG. 3 is an ATREF-DV curve showing the short chain branching distribution as related to the viscosity-average molecular weight ($M_v$) for Comparative Example 3.
Figure 4:
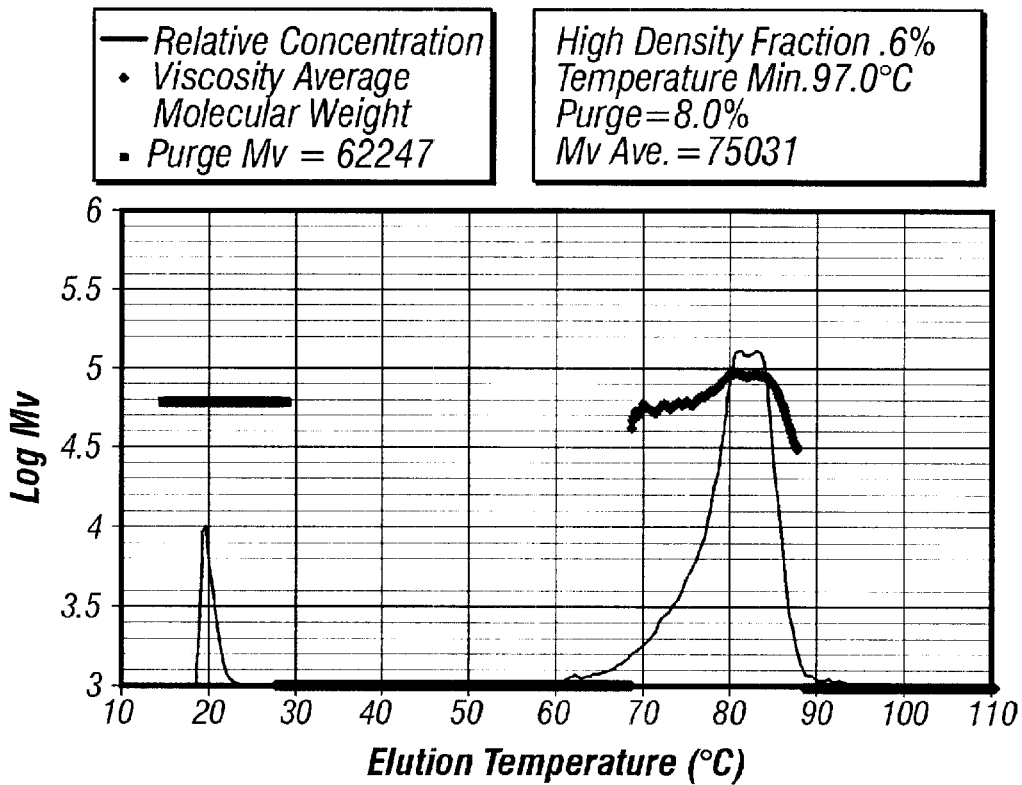
FIG. 4 is an ATREF-DV curve showing the short chain branching distribution as related to the viscosity-average molecular weight ($M_v$) for Comparative Example 4.
Figure 5:
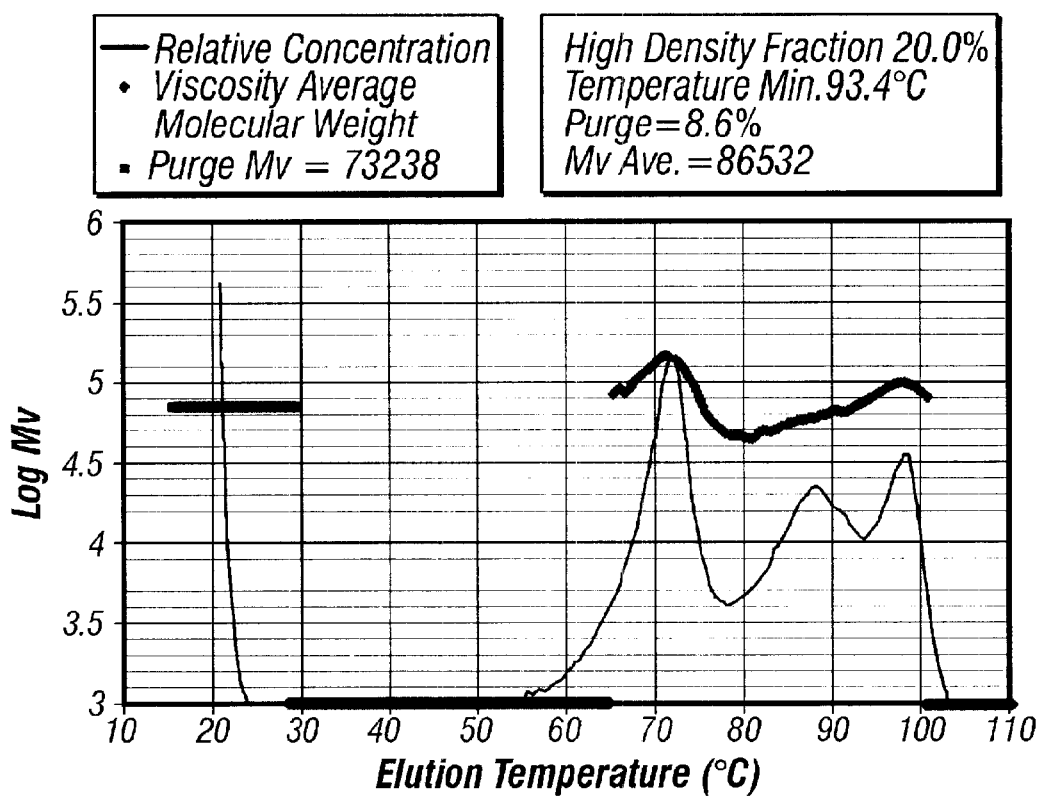
FIG. 5 is an ATREF-DV curve showing the short chain branching distribution as related to the viscosity-average molecular weight ($M_v$) for Comparative Example 5.
Figure 6:
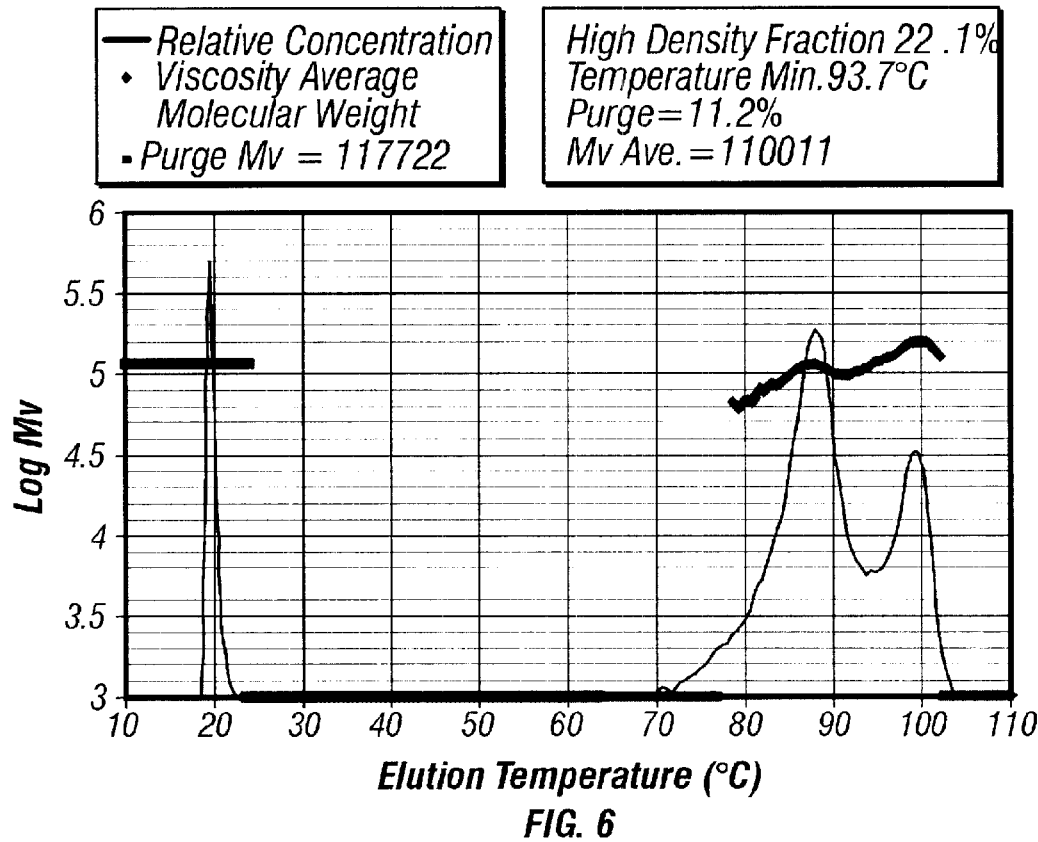
FIG. 6 is an ATREF-DV curve showing the short chain branching distribution as related to the viscosity-average molecular weight ($M_v$) for Inventive Example 6.
Figure 7:
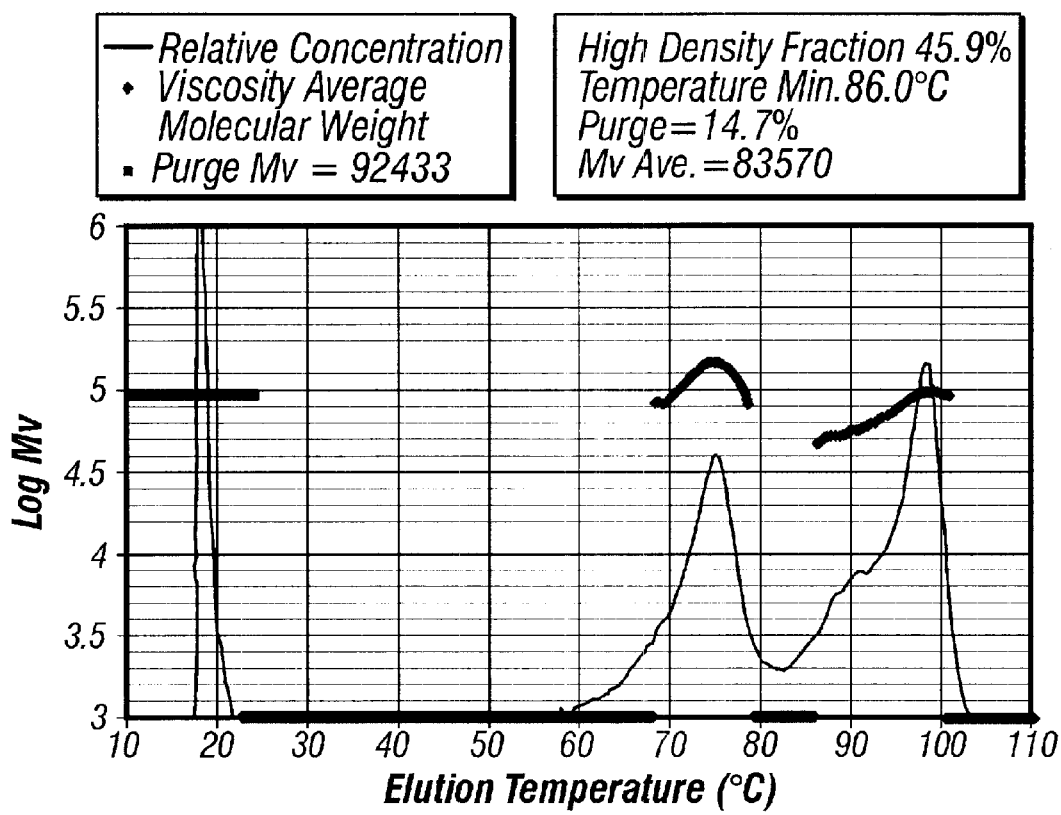
FIG. 7 is an ATREF-DV curve showing the short chain branching distribution as related to the viscosity-average molecular weight ($M_v$) for Comparative Example 7.
Figure 8:
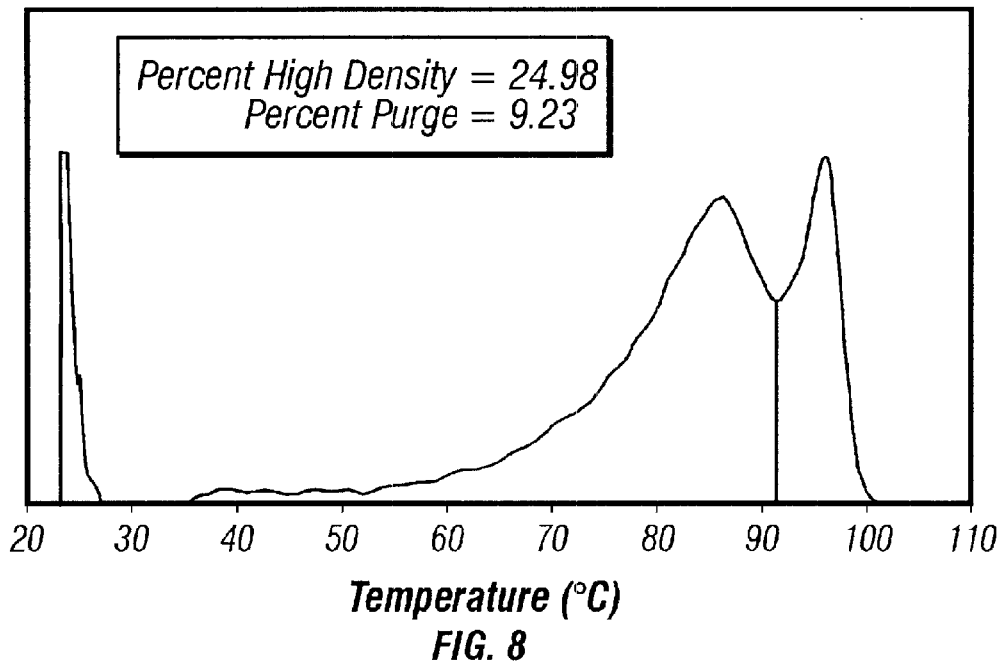
FIG. 8 is an ATREF curve showing the short chain branching distribution as for Comparative Example 8.

The term "ATREF peak temperature" as used herein refers to the elution temperature that corresponds to a peak observed on an ATREF curve as determined from temperature rising elution fractionation in the range of 20 to 110° C. A peak corresponds to a substantial weight percent of crystallized polymer portion based on the total amount of crystallizable polymer portions for the whole composition. Every ethylene polymer composition with crystallizable polymer portions will have at least one ATREF peak temperature although the composition may be characterized as having measurable crystallized polymer portions at several different peak temperatures (i.e., multiple peaks). For purposes of the present invention, an ATREF peak is discerned as distinguished from shoulders, humps and doublets. For example, in FIGS. 1 and 2, Inventive Examples 1 and 2 are both shown to be characterized by only two ATREF peaks as the Log $M_v$ response in FIG. 2 at about 90° C. is not considered to constitute an ATREF peak. Similarly, the doublet shown in FIG. 4 for comparative example 4 is also considered to constitute a single ATREF peak. For the inventive composition, $T_{peak1}$ will be the peak occurring at the lowest elution temperature and $T_{peak2}$ will be the peak occurring at the highest elution temperature in the range of 20–110° C., although the composition may also have peaks at intermediate temperatures.

The term "composition density" as used herein means the density of a single component polymer or a polymer mixture of at least two ethylene polymers measured in accordance with ASTM D-792. The term "composition density" refers to a solid state density measurement of pellets, film or a molding as distinguished from a melt density determination.

The term "single polymer component" as used herein is distinct from the term "polymer fraction" which is used in the art in reference to a fractionated polymer. Thus, as used herein, a single polymer component comprises various polymer fractions and a polymer fraction comprises smaller polymer fractions(as can be shown using, for example, ATREF).

The term "polymer", as used herein, refers to a polymeric compound prepared by polymerizing monomers, whether of the same or a different type. The generic term "polymer" thus embraces the terms "homopolymer," "copolymer," "terpolymer" as well as "interpolymer."

The term "interpolymer", as used herein, refers to polymers prepared by the polymerization of at least two different types of monomers. The generic term "interpolymer" thus includes the term "copolymers" (which is usually employed to refer to polymers prepared from two different monomers) as well as the term "terpolymers" (which is usually employed to refer to polymers prepared from three different types of monomers).

The term "substantially linear ethylene polymer" is used herein to refer specially to homogeneously branched ethylene polymers that have long chain branching. The term does not refer to heterogeneously or homogeneously branched ethylene polymers that have a linear polymer backbone.

For substantially linear ethylene polymers, the long chain branches have the same comonomer distribution as the polymer backbone, and the long chain branches can be as long as about the same length as the length of the polymer backbone to which they are attached. The polymer backbone of substantially linear ethylene polymers is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least 6 carbons, above which the length cannot be distinguished using $^{13}C$ nuclear magnetic resonance spectroscopy. The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285–297), the disclosure of which is incorporated herein by reference.

Although conventional $^{13}C$ nuclear magnetic resonance spectroscopy cannot determine the length of a long chain branch in excess of six carbon atoms, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., *J. Chem. Phys.*, 17, 1301 (1949) and Rudin, A., *Modern Methods of Polymer Characterization*, John Wiley & Sons, New York (1991) pp. 103–112, both of which are incorporated herein by reference.

A. Willem deGroot and P. Steve Chum, both of The Dow Chemical Company, at the Oct. 4, 1994 conference of the Federation of Analytical Chemistry and Spectroscopy Society (FACSS) in St Louis, Mo., presented data demonstrating that GPC-DV is a useful technique for quantifying the presence of long chain branches in substantially linear ethylene polymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/ octene copolymers.

DeGroot and Chum also showed that a plot of Log($I_2$, melt index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For substantially linear ethylene polymers, the long chain branch is longer than the short chain branch that results from the incorporation of the α-olefin(s) into the polymer backbone. The empirical effect of the presence of long chain branching in the substantially linear ethylene polymers used in the invention is manifested as enhanced Theological properties which are quantified and expressed herein in terms of gas extrusion rheometry (GER) results and/or melt flow, $I_{10}/I_2$, increases.

The substantially linear ethylene polymers useful in this invention (homopolymers as well as interpolymers) surprisingly have excellent processability, even though they have relatively narrow molecular weight distributions. Substantially linear ethylene polymers have a molecular weight distribution, $M_w/M_n$, defined by the equation:

$M_w/M_n \leq (I_{10}/I_2)-4.63$.

Even more surprising, the melt flow ratio ($I_{10}/I_2$) of the substantially linear olefin polymers can be varied essentially independently of the polydispersity index (i.e., molecular weight distribution ($M_w/M_n$)). This is contrasted with conventional heterogeneously branched linear polyethylene resins which have Theological properties such that as the polydispersity index increases, the $I_{10}/I_2$ value also increases. Also, for the substantially linear ethylene polymers used in the compositions of the invention, the $I_{10}/I_2$ ratio indicates the degree of long chain branching, i.e., the higher the $I_{10}/I_2$ ratio, the more long chain branching in the polymer.

The "Theological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the substantially linear ethylene polymers described herein, the PI is the apparent viscosity (in kpoise) of a material measured by GER at an apparent shear stress of $2.15 \times 10^6$ dyne/cm². The substantially linear ethylene polymers described herein preferably have a PI in the range of about 0.01 kpoise to about 50 kpoise, preferably 15 kpoise or less. The substantially linear ethylene polymers described herein have a PI less than or equal to 70 percent of the PI of a comparative linear ethylene polymer which does not contain long chain branching but has about the same $I_2$ and $M_w/M_n$ as the substantially linear ethylene polymer being compared.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40× magnification. The critical shear rate at onset of surface melt fracture for the substantially linear ethylene polymers is at least 50 percent greater than the critical shear rate at the onset of surface melt fracture of a linear ethylene polymer which does not contain long chain branching but has about the same $I_2$ and $M_w/M_n$ as the substantially linear ethylene polymer being compared, wherein "about the same" as used herein means that each value is within 10 percent of the comparative value of the comparative linear ethylene polymer.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

In addition to having a narrow molecular weight distribution, substantially linear ethylene polymers are characterized as having:

(a) melt flow ratio, $I_{10}/I_2 \geq 5.63$, and (b) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$ and $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer.

Preferred substantially linear ethylene polymers are further characterized as having a single differential scanning calorimetry, DSC, melting peak between −30° and 150° C.

Substantially linear ethylene polymers are homogeneously branched ethylene polymers and are disclosed in U.S. Pat. No. 5,272,236; U.S. Pat. No. 5,278,272; and U.S. Pat. No. 5,665,800, the disclosures of all three of which are incorporated herein by reference. Homogeneously branched substantially linear ethylene polymers can be prepared via the continuous solution, slurry, or gas phase polymerization of ethylene and at least one optional α-olefin comonomer in the presence of a constrained geometry catalyst, such as the method disclosed in European Patent Application 416,815-A, which is incorporated herein by reference. The polymerization can generally be performed in any reactor system known in the art including, but not limited to, a tank reactor(s), a sphere reactor(s), a recycling loop reactor(s) or combinations thereof and the like, any reactor or all reactors operated partially or completely adiabatically, nonadiabatically or a combination of both and the like. Preferably, a continuous solution polymerization process is used to manufacture the substantially linear ethylene polymer used in the present invention.

The term "heterogeneously branched linear ethylene polymer" is used herein in the conventional sense in reference to a linear ethylene interpolymer having a comparatively low short chain branching distribution index. That is, the interpolymer has a relatively broad short chain branching distribution. Heterogeneously branched linear ethylene polymers have a SCBDI less than 50 percent and more typically less than 30 percent.

The term "homogeneously branched linear ethylene polymer" is used herein in the conventional sense to refer to a linear ethylene interpolymer in which the comonomer is randomly distributed within a given polymer molecule and wherein substantially all of the polymer molecules have the same ethylene to comonomer molar ratio. The term refers to an ethylene interpolymer that is characterized by a relatively high short chain branching distribution index (SCBDI) or composition distribution branching index (CDBI). That is, the interpolymer has a SCBDI greater than or equal to 50 percent, preferably greater than or equal to 70 percent, more preferably greater than or equal to 90 percent. At higher degrees of compositional uniformity, homogeneously branched ethylene polymers can be further characterized as essentially lacking a measurable high density, high crystallinity polymer portion as determined using a temperature rising elution fractionation technique (abbreviated herein as "TREF").

Homogeneously branched ethylene polymers (i.e. both substantially linear ethylene polymers and homogeneously branched linear ethylene polymers) for use in the present invention can be also described as having less than 15 weight percent, preferably less than or equal to 10 weight percent, more preferably less than or equal to 5 weight percent and most preferably zero (0) weight percent of the polymer with a degree of short chain branching less than or equal to 10 methyls/1000 carbons, preferably less than or equal to 5 methyls/1000 carbons. That is, the polymer contains no measurable high density polymer fraction (e.g., there is no fraction having a density of equal to or greater than 0.94 g/cm³), as determined, for example, using a temperature rising elution fractionation (TREF) technique and infrared or $^{13}$C nuclear magnetic resonance (NMR) analysis. Conversely, heterogeneously branched ethylene polymers can be described as having greater than or equal to 15 weight percent (based on the total weight of the polymer) of the polymer with a degree of short chain branching less than or equal to 10 methyls/1000 carbons.

Preferably, the homogeneously branched ethylene polymer is characterized as having a narrow, essentially single melting TREF profile/curve and essentially lacking a measurable high density polymer portion, as determined using a temperature rising elution fractionation technique (abbreviated herein as "TREF").

SCBDI is defined as the weight percent of the polymer molecules having a comonomer content within 50 percent of the median total molar comonomer content and represents a comparison of the monomer distribution in the interpolymer to the monomer distribution expected for a Bernoullian distribution. The SCBDI of an interpolymer can be readily calculated from TREF as described, for example, by Wild et al., *Journal of Polymer Science, Poly. Phys. Ed.*, Vol. 20, p. 441 (1982), or in U.S. Pat. No. 4,798,081; 5,008,204; or by L. D. Cady, "The Role of Comonomer Type and Distribution in LLDPE Product Performance," SPE Regional Technical Conference, Quaker Square Hilton, Akron, Ohio, October 1–2, pp. 107–119 (1985), the disclosures of all which are incorporated herein by reference. However, the preferred TREF technique does not include purge quantities in SCBDI calculations. More preferably, the monomer distribution of the interpolymer and SCBDI are determined using $^{13}$C NMR analysis in accordance with techniques described in U.S. Pat. No. 5,292,845; U.S. Pat. No. 4,798,081; U.S. Pat. No. 5,089,321 and by J. C. Randall, *Rev. Macromol. Chem. Phys.*, C29, pp. 201–317, the disclosures of both of which are incorporated herein by reference.

In analytical temperature rising elution fractionation analysis (as described in U.S. Pat. No. 4,798,081 and abbreviated herein as "ATREF"), the film or composition to be analyzed is dissolved in a suitable hot solvent (e.g., trichlorobenzene) and allowed to crystallized in a column containing an inert support (stainless steel shot) by slowly reducing the temperature. The column is equipped with both a refractive index detector and a differential viscometer (DV) detector. An ATREF-DV chromatogram curve is then generated by eluting the crystallized polymer sample from the column by slowly increasing the temperature of the eluting solvent (trichlorobenzene). The ATREF curve is also frequently called the short chain branching distribution (SCBD), since it indicates how evenly the comonomer (e.g., octene) is distributed throughout the sample in that as elution temperature decreases, comonomer content increases. The refractive index detector provides the short chain distribution information and the differential viscometer detector provides an estimate of the viscosity average molecular weight. The short chain branching distribution and other compositional information can also be determined using crystallization analysis fractionation such as the CRYSTAF fractionalysis package available commercially from PolymerChar, Valencia, Spain.

The inventive composition is broadly characterized as having a $M_{v1}/M_{v2}$ in the range of from about 0.6 to about 1.2, preferably less than or equal to 1.0 and more preferably in the range of from about 0.8 to about 1. When $M_{v1}/M_{v2}$ is substantially diverge from 1.0, compositions with improved dart impact resistance may result, however, other toughness properties (i.e., ultimate tensile strength and tear resistance) will invariably be unbalanced when fabricated as blown film.

The inventive composition at a composition density of in the range of about 0.92 g/cm$^3$ to about 0.926 g/cm$^3$ is characterized as having an ATREF peak temperature differential with respect to the at least two component polymers in the range of about 10° C. to about 22° C., preferably from about 12° C. to about 20° C. and more preferably from about 14° C. to about 18° C. However, persons skilled in the art having appreciated the present invention, especially the Examples reported herein below, will recognize that the distinguishing $\Delta T$ parameter of the present invention varies with composition densities. Accordingly, the inventive composition is generally characterized as having a $\Delta T$ which decreases with increased composition density such that $\Delta T$ is less than 23° C. at composition densities greater than or equal to 0.926 g/cm$^3$ and greater than 13° C. at composition densities less than or equal to 0.92 g/cm$^3$. Preferably, however, the inventive composition is characterized as having a first ATREF peak temperature, $T_{peak1}$ and a second ATREF peak temperature, $T_{peak2}$, corresponding to the at least two components and as determined using analytical temperature rising elution fraction (ATREF), wherein the temperature differential between $T_{peak2}$ and $T_{peak1}$, $\Delta T$, is equal to or less than the product of the equation:

$$\Delta T = [5650.842 \times \rho^2] - [11334.5 \times \rho] + 5667.93$$

where $\Delta T$ is in degrees Celsius and $\rho$ is composition density in g/cm$^3$ and is especially characterized as having a $\Delta T$ which is about equal to or greater than the product of the equation:

$$\Delta T_{lower} = [5650.842 \times \rho^2] - [11334.5 \times \rho] + 5650.27$$

and which is about equal to or less than the product of the equation:

$$\Delta T_{Upper} = [5650.842 \times \rho^2] - [11334.5 \times \rho] + 5667.93$$

where $\Delta T$ is in degrees Celsius and $\rho$ is composition density in g/cm$^3$. That is, the $\Delta T$ is in the range of the $\Delta T_{Lower}$ and $\Delta T_{upper}$.

Preferably, the inventive composition is further characterized as having a density differential between the densities of the second and first polymer components in the range of from about 0 to about 0.028 g/cm$^3$, preferably in the range of from about 0.008 to about 0.026 g/cm$^3$, and more preferably from about 0.01 to about 0.016 g/cm$^3$.

Preferably, the inventive composition is further characterized as having a $M_{w1}/M_{w2}$ (i.e. a ratio of the weight average molecular weight of the first component polymer to the weight average molecular weight of the second component polymer, as determined by GPC which is independent of $M_{v1}/M_{v2}$) of less than or equal to 1.2, and preferably less than or equal to 1.

The composition density of the novel composition is generally less than 0.945 g/cc, preferably less than 0.94 g/cc and more preferably less than 0.938 g/cc, and is especially in the range of from about 0.90 to about 0.45 g/cm$^3$, more especially in the range of from about 0.912 to about 0.938 g/cm$^3$ and most especially in the range of from about 0.915 to about 0.935 g/cm$^3$ (as measured in accordance with ASTM D-792).

The molecular weight of polyolefin polymers is conveniently indicated using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear. The overall $I_2$ melt index of the novel composition is preferably in the range of from about 0.001 to about 200 g/10 minutes, more preferably from about 0.01 to about 20 g/10 minutes, most preferably from about 0.01 to about 10 g/10 minutes and especially when fabricated as blown films is in the range from about 0.1 to about 2.2 g/10 minutes, more preferably from about 0.2 and about 1.8 g/10 minutes.

Other measurements useful in characterizing the molecular weight of ethylene interpolymer compositions involve melt index determinations with higher weights, such as, for common example, ASTM D-1238, Condition 190° C./10 kg (formerly known as "Condition N" and also known as $I_{10}$). The ratio of a higher weight melt index determination to a lower weight determination is known as a melt flow ratio, and for measured $I_{10}$ and the $I_2$ melt index values the melt flow ratio is conveniently designated as $I_{10}/I_2$.

Broadly, the inventive composition has an $I_{10}/I_2$ melt flow ratio greater than 6.6, more preferably greater than or equal to 6.9, most preferably greater than or equal to 7.1, and especially in the range of from greater than 6.6 to about 8.2, more especially in the range of from about 6.7 to about 8.2 and most especially in the range of from about 6.8 to about 7.8.

However, in certain preferred embodiments, where maximized optical properties and improved processability are desired, at least one polymer component will be a substantially linear ethylene polymer (i.e. an ethylene polymer made in a continuous polymerization process using a constrained geometry catalyst system and which results in the so-made polymer having long chain branching). In such preferred embodiments, the inventive composition itself is preferably further characterized as having (in the range of from about 0.01 long chain branches/1,000 carbons to about 3 long chain branches/1,000 carbons) greater than or equal to 0.08 long chain branch per 10,000 carbons, more preferably greater than or equal to 0.1 long chain branch per 10,000 carbons and most preferably greater than or equal to 0.2 long chain branch per 10,000 carbons.

The molecular weight distributions of ethylene polymers are determined by gel permeation chromatography (GPC) on a Waters 150C high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4- trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a^*(M_{polystyrene})^b.$$

In this equation, a=0.4316 and b=1.0. Weight average molecular weight, $M_w$, is calculated in the usual manner according to the following formula: $M_j=(\Sigma w_i(M_i^j))^j$; where $w_i$ is the weight fraction of the molecules with molecular weight $M_i$ eluting from the GPC column in fraction i and j=1 when calculating $M_w$ and j=−1 when calculating $M_n$. The novel composition has $M_w/M_n$ less than or equal to 3.3, preferably less than or equal to 3, and especially in the range of from about 2.4 to about 3.

ATREF analysis can conveniently illuminate several key structural features of a film or composition. For example, homogeneously branched ethylene polymers such as AFFINITY resins supplied by The Dow Chemical Company, ENGAGE resins supplied by Dupont Dow Elastomers, TAFMER resins supplied by Mitsui Chemical Corporation and EXACT resins supplied by Exxon Chemical Corporation are known to exhibit a unique symmetrical single elution peak (or homogeneous SCBD). In contrast, ethylene polymers produced by a conventional Ziegler-Natta catalyst system (such as, for example, DOLWEX LLDPE resins supplied by The Dow Chemical Company) are known to exhibit a bimodal or heterogeneous SCBD with both a broad and a narrow peak eluting at significantly different temperatures.

Because the uniqueness of the shape of ATREF curves and elution temperatures correspond to polymer densities, ATREF analysis can be used to fingerprint particular polymers. In particular, for compositions consisting of multiple component polymers, by integrating the ATREF curve, the weight fraction of each component can be conveniently determined. Further, the density of component polymers can be determined from ATREF analysis where the composition is known from measurement in accordance with ASTM D-792. For example, for substantially linear ethylene polymers, calibration curves of ATREF elution temperature versus polymer density provide polymer density is defined by:

$$\rho = 0.83494 + 9.6133 \times 10^{-4}(T_e)$$

where $T_e$ is the ATREF elution temperature of the polymer. Given the overall composition density of the composition, the weight fraction of the component polymer by integration of the ATREF curve and the polymer density of the substantially linear ethylene polymer component, the density of the remain component polymer can be conveniently calculated.

To further characterize a polymer composition or mixture, a differential viscometer may be employed. The output from a differential viscometer is the viscosity average molecular weight, $M_v$, which indicates the variation in molecular weight as a function of elution volume. The $M_v$ response can indicate which component polymer is characterized as having a higher molecular weight or whether the component polymers are characterized as having substantially equivalent molecular weights.

In summary, given the ATREF curve and composition density of a film or composition, the weight fraction and polymer densities of the component polymers can be calculated. Combining ATREF analysis with a differential viscometer (ATREF/DV) gives an indication of the relative molecular weights of the component polymers. As such, AFTREF/DV can be used to fingerprint the film or composition of the present invention. The AFREF curve will show at least two distinct elution peaks given to density differential between the first and second ethylene polymers of the invention and preferred embodiments will exhibit a single elution peak associated with the first ethylene polymer component and a second ethylene polymer component having a higher molecular weight than the first ethylene polymer component.

A GPC deconvolution technique can be used to determine the melt index of individual ethylene polymer components. In this technique, GPC data are generated using a Waters 150C high temperature GPC chromatograph as described herein above. Given empirical elution volumes, molecular weights can be conveniently calculated using a calibration curve generated from a series of narrow molecular weight distribution polystyrene standards. The GPC data should be normalized prior to running the deconvolution procedure to insure an area of unity under the weight fraction versus log(MW) GPC curve.

For the deconvolution technique, homogeneously branched ethylene polymers are assumed to follow a Bamford-Tompa molecular weight distribution, i.e., Eq. [1], $$w_i(M_i) = \ln(10) \frac{M_i}{M_n} \exp\left(\left(-\frac{M_i(1+\zeta)}{M_n}\right)\right) \times \left(\frac{2+\zeta}{\zeta}\right)^{1/2} \times I_1\left(\frac{M_i \zeta^{1/2}(2+\zeta)^{1/2}}{M_n}\right) \quad [1]$$

where $w_i$ is the weight fraction of polymer with molecular weight $M_i$, $M_n$ is the number average molecular weight, $I_1(x)$ is the modified Bessel function of the first kind of order one, defined by Eq. [2], $$I_1(x) = \sum_b \frac{x^{2b+1}}{2^{2b+1} b!(b+1)!} \quad [2]$$

and $\zeta$ is an adjustable parameter which broadens the molecular weight distribution, as shown in Eq. [3].

$$\frac{M_w}{M_n} = 2 + \zeta \quad [3]$$

For the deconvolution technique, heterogeneously branched ethylene polymers (i.e., polymers manufactured using a Ziegler-Natta catalyst system) are assumed to follow a log-normal distribution, Eq. [4], $$w_i(M_i) = \frac{1}{\beta(2\pi)^{0.5}} \exp\left(-\frac{1}{2}\left(\frac{\log(M_i) - \log(M_o)}{\beta}\right)^2\right) \quad [4]$$

where $w_i$ is the weight fraction of polymer with molecular weight $M_i$, $M_o$ is the peak molecular weight and $\beta$ is a parameter which characterizes the width of the distribution. β was assumed to be a function of $M_o$, as shown in Eq. [5].

$$\beta = 5.70506 - 2.52383 \text{Log}(M_o) + 0.30024 (\text{Log}(M_o))^2 \quad [5]$$

The GPC deconvolution technique involves a four parameter fit, $M_n$ and ζ for a homogeneously branched ethylene polymer (typically the first ethylene polymer component of the invention), $M_o$ for a heterogeneously branched ethylene polymer (preferably the second component polymer of the invention) and the weight fraction amount of the homogeneously branched ethylene polymer. A non-linear curve-fitting subroutine within SigmaPlot™ supplied by Jandel Scientific (v3.03) is used to estimate these parameters. Given the number average molecular weight ($M_n$), Eq. [3], of the homogeneously branched ethylene polymer or the first ethylene polymer component, its $I_{10}/I_2$ melt flow ratio and its density, its $I_2$ melt index can be conveniently calculated using Eq. [6].

$$I_2^{FCPA} = \exp\left(62.782 - 3.8620\,\text{Ln}(M_w) - 1.7095\,\text{Ln}\left(\left(\frac{I_{10}}{I_2}\right)^{FCPA}\right) - 16.310 \times \rho^{FCPA}\right) \quad [6]$$

where FCPA denotes the ethylene polymer component.

The novel composition can be formed by any convenient method, including dry blending selected polymer components together and subsequently melt mixing the component polymers in an extruder or by mixing the polymer components together directly in a mixer (e.g., a Banbury mixer, a Haake mixer, a Brabender internal mixer, or a single or twin screw extruder including a compounding extruder and a side-arm extruder employed directly down stream of a polymerization process).

Preferably, the novel composition is manufactured in-situ using any polymerization method and procedure known in the art (including solution, slurry or gas phase polymerization processes at high or low pressures) provided the operations, reactor configurations, catalysis systems and the like are selected, employed and carried out to indeed provide the novel composition with its defined combination of characteristics. A preferred method of manufacturing the novel composition involves the utilization of a multiple reactor polymerization system with the various reactors operated in series or in parallel configuration or a combination of both where more than two reactors are employed. More preferably, the novel composition is manufactured using a two reactor system wherein the two reactors are operated in a series configuration.

The inventive composition preferably comprises greater than or equal to 40 weight percent of the first component polymer, more preferably greater than or equal to 45 weight percent of the first component polymer and preferably less than or equal to 60 weight percent of the second component polymer, more preferably less than or equal to 55 weight percent of the second component polymer, based on the total weight of the composition.

In one especially preferred embodiment of the present invention, the invention compositions comprises from about 60 to about 75 weight percent of the first component polymer and from about 5 to about 40 weight percent of the second component polymer, especially from about 65 to about 70 weight percent of the first component polymer and from about 10 to about 30 weight percent of the second component polymer, based on the total weight of the composition.

In a multiple reactor polymerization system (and especially in a two reactor system) with reactors configured in series, the polymer split is generally greater than or equal to 40 weight percent, preferably in the range of from about 45 to about 80 weight percent, more preferably in the range of from about 60 weight percent to about 75 weight percent, and most preferably in the range of from about 65 to about 70 weight percent for the first reactor in the series, based on total amount of polymer produced by the polymerization system.

Preferably, the first component (i.e., the polymer component manufactured in the first reactor of a series) will be characterized by a lower polymer density and a molecular weight equal to or lower than the second (or last) component polymer (i.e. $M_{w1}/M_{w2} \leq 1$). To insure this preference, it may be necessary in a continuous polymerization system to adjust the percent of make-up comonomer feed (e.g., octene) to the second reactor (or any other reactor other than the first reactor in a series).

If the multiple reactor polymerization comprises two reactors, then the polymer mass split to the second reactor in the series will generally be equal to or less than 60 weight percent and preferably in the range of from about 40 weight percent to about 55 weight percent. The first reactor is a series configuration will typically be that reactor situated furthest away from the product outlet to finishing operations.

Also, in a preferred embodiment of the invention, a polymerization system consisting of at least one recirculating flow loop reactor and especially a polymerization system consisting of at least two recirculating loop reactors operated nonadiabatically (more especially with each loop reactor having heat exchange/removal capacities) is employed to manufacture the novel composition. Such preferred polymerization systems are as described by Kao et al. in WO 97/36942, the disclosure of which is incorporated herein by reference.

The nonadiabatic polymerization is preferably achieved at a continuous volumetric heat removal rate equal to or greater than about 400 Btu/hour•cubic foot•° F. (7.4 kW/m³•° K.), more preferably, equal to or greater than about 600 Btu/hour•cubic foot•° F. (11.1 kW/m³•° K.), more especially equal to or greater than about 1,200 Btu/hour•cubic foot•° F. (22.2 kW/m³•° K.) and most especially equal to or greater than about 2,000 Btu/hour•cubic foot•° F. (37 kW/m³•° K.).

"Volumetric heat removal rate" as used herein is the process heat transfer coefficient, U, in Btu/hour•square foot•° F., multiplied by the heat exchange area, A, in square feet, of the heat exchange apparatus divided by the total reactor system volume, in cubic feet. One of ordinary skill will recognize that there should be consistency respecting whether process side or outside parameters are used as to U and surface area calculations and determinations. The calculations contained herein are based on outside surface areas and diameters of heat exchange tubes, coils, etc. whether or not the reactor mixture flows through such tubes, coils, etc. or not.

To effectuate nonadiabatic polymerization, any suitable heat exchange apparatus may be used, in any configuration, including, for example, a cooling coil positioned in a polymerization reactor or reactors, a shell-and-tube heat exchanger positioned in a polymerization reactor or reactors wherein the reactor flow stream(s) (also referred to in the art as "reaction mixture") passes through the tubes, or an entire recirculating flow loop reactor being designed as a heat exchange apparatus by providing cooling via a jacket or double piping. In a suitable design, a form of a shell-and-tube heat exchanger can be used wherein the exchanger housing has an inlet and an outlet for the reactor flow stream and an inlet and outlet for heat transfer media (e.g. water, water/glycol, steam, SYLTHERMO™ material or media supplied by The Dow Chemical Company under the designation DOWTHERM®). In another design, the reactor flow stream flows through a plurality of heat transfer tubes within the heat exchanger housing while the heat transfer media flows over the tubes' exterior surfaces transferring the heat of reaction or polymerization from the reactor flow stream. Alternatively, the reaction stream flows through the housing and the heat transfer media flows through the tubes. Suitable heat exchange apparatuses for use in the manufacturing of the novel composition are commercially available items (such as, for example, a static mixer/heat exchanger supplied by Koch) having a tortuous path therethrough defined by the tubes' tubular walls and/or having solid static interior elements forming an interior web through which the reaction mixture flows.

The polymerization reaction to prepared the component polymers may be any reaction type or combination of reactions known in the art, including polymerization by solution, high pressure, slurry and gas pressure. In one preferred embodiment, polymerization is conducted under continuous slurry or solution polymerization conditions in at least one reactor to prepared at least one component polymer. In another embodiment, the polymerization is conducted under continuous solution polymerization conditions in at least one reactor to prepare the first component polymer. In another embodiment, the polymerization is conducted under continuous slurry polymerization conditions in at least one reactor to prepare the second component polymer.

It is generally contemplated that any known catalyst system useful for polymerizing olefins can be used to manufacture the novel composition including, for example, conventional Ziegler-Natta catalyst systems, chromium catalyst systems, so-called single site metallocene catalyst systems such as the monocyclopentadienyl transition metal olefin polymerization catalysts described by Canich in U.S. Pat. No. 5,026,798 or by Canich in U.S. Pat. No. 5,055,438, the disclosures of which are incorporated herein by reference, and constrained geometry catalyst systems as described by Stevens et al. in U.S. Pat. No. 5,064,802, the disclosure of which is incorporated herein by reference. However, in preferred embodiments, a metallocene catalyst system and conventional Ziegler-Natta catalyst system are used to manufacture the novel composition. For preferred embodiments that utilize a polymerization system consisting of at least two reactors in series configuration, preferably a constrained geometry catalyst system is employed in the first reactor (or first set of reactors) and a conventional Ziegler-Natta catalyst system is employed in the second reactor (or last set of reactors).

Catalysts and catalyst systems for use in the invention are described, for example, in EP-A-0 277 003; EP-A-0 277 004; EP-A-0 420 436; PCT International Publications WO 91/04257; WO 92/00333; WO 93/08221; and WO 93/08199, U.S. Pat. Nos. 3,645,992; 4,076,698; 4,612,300; 4,937,299; 5,096,867; 5,055,438; and 5,064,802, the disclosures of all of which are incorporated herein by reference.

Suitable metallocene catalyst components for use in the present invention may be derivatives of any transition metal including Lanthanides, but preferably of Group 3, 4, or Lanthanide metals which are in the +2, +3, or +4 formal oxidation state. Preferred compounds include metal complexes containing from 1 to 3 π-bonded anionic or neutral ligand groups, which may be cyclic or non-cyclic delocalized π-bonded anionic ligand groups. Exemplary of such π-bonded anionic ligand groups are conjugated or nonconjugated, cyclic or non-cyclic dienyl groups, allyl groups, and arene groups. By the term "π-bonded" is meant that the ligand group is bonded to the transition metal by means of a π bond.

Examples of suitable anionic, delocalized π-bonded groups include cyclopentadienyl, indenyl, fluorenyl, tetrahydroindenyl, tetrahydro-fluorenyl, octahydrofluorenyl, pentadienyl, cyclohexadienyl, dihydroanthracenyl, hexahydroanthracenyl, and decahydro-anthracenyl groups, as well as $C_1$–$C_{10}$ hydrocarbyl-substituted or $C_1$–$C_{10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydro-fluorenyl, octahydrofluorenyl, and tetrahydroindenyl.

Suitable cocatalysts for use herein include but are not limited to, for example, polymeric or oligomeric aluminoxanes, especially methyl aluminoxane or modified methyl aluminoxane (made, e.g., as described in U.S. Pat. Nos.: 5,041,584; 4,544,762; 5,015,749; and 5,041,585, the disclosures of each of which are incorporated herein by reference) as well as inert, compatible, non-coordinating, ion forming compounds. Preferred cocatalysts are inert, non-coordinating, boron compounds.

The Ziegler catalysts suitable for the preparation of the heterogeneous component of the current invention are typical supported, Ziegler-type catalysts which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. No. 4,314,912 (Lowery, Jr. et al.), U.S. Pat. No. 4,547,475 (Glass et al.), and U.S. Pat. No. 4,612,300 (Coleman, III), the teachings of which are incorporated herein by reference.

Particularly suitable organomagnesium compounds include, for example, hydrocarbon soluble dihydrocarbylmagnesium such as the magnesium dialkyls and the magnesium diaryls. Exemplary suitable magnesium dialkyls include particularly n-butyl-sec-butylmagnesium, diisopropylmagnesium, di-n-hexylmagnesium, isopropyl-n-butyl-magnesium, ethyl-n-hexylmagnesium, ethyl-n-butylmagnesium, di-n-octylmagnesium and others wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides, metallic halides, and hydrogen chloride.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, that is, as easily lost to another compound, as the halogen of sec-butyl chloride, preferably as active as t-butyl chloride. In addition to the organic monohalides, it is understood that organic dihalides, trihalides and other polyhalides that are active as defined herein before are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride. Most preferred are hydrogen chloride, t-butyl chloride, allyl chloride and benzyl chloride.

Suitable metallic halides which can be employed herein include those represented by the formula $$MR_{y-a}X_a$$

wherein:

M is a metal of Groups IIB, IIIA or IVA of Mendeleev's Periodic Table of Elements, R is a monovalent organic radical, X is a halogen, Y has a value corresponding to the valence of M, and a has a value from 1 to y.

Preferred metallic halides are aluminum halides of the formula $$AlR_{3-a}X_a$$

wherein:

each R is independently hydrocarbyl as hereinbefore defined such as alkyl,

X is a halogen, and a is a number from 1 to 3.

Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, for example, R", and the organic moieties of the halide source, for example, R and R', are suitably any other organic radical provided that they do not contain functional groups that poison conventional Ziegler catalysts.

The magnesium halide can be pre-formed from the organomagnesium compound and the halide source or it can be formed in situ in which instance the catalyst is preferably prepared by mixing in a suitable solvent or reaction medium (1) the organomagnesium component and (2) the halide source, followed by the other catalyst components.

Any of the conventional Ziegler-Natta transition metal compounds can be usefully employed as the transition metal component in preparing the supported catalyst component. Typically, the transition metal component is a compound of a Group IVB, VB, or VIB metal. The transition metal component is generally, represented by the formulas: $TrX'_{4-q}(OR^1)_q$, $TrX'_{4-q}R^2_q$, $VOX'_3$ and $VO(OR^1)_3$.

wherein:

Tr is a Group IVB, VB, or VIB metal, preferably a Group IVB or VB metal, preferably titanium, vanadium or zirconium, q is 0 or a number equal to or less than 4, X' is a halogen, and $R^1$ is an alkyl group, aryl group or cycloalkyl group having from 1 to 20 carbon atoms, and $R^2$ is an alkyl group, aryl group, aralkyl group, or substituted aralkyls.

The aryl, aralkyls and substituted aralkys contain 1 to 20 carbon atoms, preferably 1 to 10 carbon atoms. When the transition metal compound contains a hydrocarbyl group, $R^2$, being an alkyl, cycloalkyl, aryl, or aralkyl group, the hydrocarbyl group will preferably not contain an H atom in the position beta to the metal carbon bond.

Illustrative but non-limiting examples of aralkyl groups are methyl, neo-pentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative but non-limiting examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$, $Ti(O-i-C_3H_7)_4$, and $Ti(O-n-C_4H_9)_4$.

Illustrative but non-limiting examples of vanadium compounds include $VCl_4$, $VOCl_3$, $VO(OC_2H_5)_3$, and $VO(OC_4H_9)_3$.

Illustrative but non-limiting examples of zirconium compounds include $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

As indicated above, mixtures of the transition metal compounds may be usefully employed, no restriction being imposed on the number of transition metal compounds which may be contracted with the support. Any halogenide and alkoxide transition metal compound or mixtures thereof can be usefully employed. The previously named transition metal compounds are especially preferred with vanadium tetrachloride, vanadium oxychloride, titanium tetraisopropoxide, titanium tetrabutoxide, and titanium tetrachloride being most preferred.

Suitable catalyst materials may also be derived from a inert oxide supports and transition metal compounds. Examples of such compositions suitable for use in the solution polymerization process are described in U.S. Pat. No. 5,420,090 (Spencer. et al.), the teachings of which are incorporated herein by reference.

The inorganic oxide support used in the preparation of the catalyst may be any particulate oxide or mixed oxide as previously described which has been thermally or chemically dehydrated such that it is substantially free of adsorbed moisture.

The specific particle size, surface area, pore volume, and number of surface hydroxyl groups characteristic of the inorganic oxide are not critical to its utility in the practice of the invention. However, since such characteristics determine the amount of inorganic oxide to be employed in preparing the catalyst compositions, as well as affecting the properties of polymers formed with the aid of the catalyst compositions, these characteristics must frequently be taken into consideration in choosing an inorganic oxide for use in a particular aspect of the invention. In general, optimum results are usually obtained by the use of inorganic oxides having an average particle size in the range of 1 to 100 microns, preferably 2 to 20 microns; a surface area of 50 to 1,000 square meters per gram, preferably 100 to 450 square meters per gram; and a pore volume of 0.5 to 3.5 $cm^3$ per gram; preferably 0.5 to 2 $cm^3$ per gram.

In order to further improve catalyst performance, surface modification of the support material may be desired. Surface modification is accomplished by specifically treating the support material such as silica, alumina or silica-alumina with an organometallic compound having hydrolytic character. More particularly, the surface modifying agents for the support materials comprise the organometallic compounds of the metals of Group IIA and IIIA of the Periodic Table. Most preferably the organometallic compounds are selected from magnesium and aluminum organometallics and especially from magnesium and aluminum alkyls or mixtures thereof represented by the formulas and $R^1MgR^2$ and $R^1R^2AlR^3$ wherein each of $R^1$, $R^2$ and $R^3$ which may be the same or different are alkyl groups, aryl groups, cycloalkyl groups, aralkyl groups, alkoxide groups, alkadienyl groups or alkenyl groups. The hydrocarbon groups $R^1$, $R^2$ and $R^3$ can contain between 1 and 20 carbon atoms and preferably from 1 to 10 carbon atoms.

The surface modifying action is effected by adding the organometallic compound in a suitable solvent to a slurry of the support material. Contact of the organometallic compound in a suitable solvent and the support is maintained from about 30 to 180 minutes and preferably from 60 to 90 minutes at a temperature in the range of 20° to 100° C. The diluent employed in slurrying the support can be any of the solvents employed in solubilizing the organometallic compound and is preferably the same.

Any convenient method and procedure known in the art can be used to prepare a Ziegler-Natta catalyst suitable for use in the present invention. One suitable method and procedure is described in U.S. Pat. No. 4,612,300 (the disclosure of which is incorporated herein by reference), in Example P. The described method and procedure involves sequentially adding to a volume of Isopar™ E hydrocarbon, a slurry of anhydrous magnesium chloride in Isopar™ E hydrocarbon, a solution of $EtAlCl_2$ in n-hexane, and a solution of $Ti(O-iPr)_4$ in Isopar™ E hydrocarbon, to yield a slurry containing a magnesium concentration of 0.166 M and a ratio of Mg/Al/Ti of 40.0:12.5:3.0. An aliquot of this slurry and a dilute solution of $Et_3Al$ (TEA) are independently pumped in two separate streams and combined immediately prior to introduction polymerization reactor system to give an active catalyst with a final TEA:Ti molar ratio of 6.2:1.

More preferably, the support (e.g. silica and magnesium) to metal (e.g. vanadium, zirconium and titanium) molar ratio and the support surface area will be high. In one preferred embodiment, a $MgCl_2$ supported titanium catalyst system is employed to manufacture the second polymer component wherein the molar ratio between the magnesium and the titanium is in the range of 40 moles of Mg to less than 3 moles of Ti, preferably 40 moles of Mg to less than 2 moles Ti, more preferably 40.0 moles of Mg to 1.3–1.7 moles of Ti. Most preferably, this $MgCl_2$ supported titanium catalyst system is characterized by the $MgCl_2$ having a single pore size distribution of about 20 to about 25 microns and a specific surface area of about 400 to about 430 $m^2$/gram.

Preferred dialkylmagnesium precursors for Mg support Ziegler Natta organomagnesium catalyst system are butyloctylmagnesium or butylethylmagnesium which are often stabilized with butykated hydroxytoluene (BHT) at about 0.5 mol %.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$α-olefins such as propylene, isobutylene, 1-butene, 1-hexene, 1-pentene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylene, vinylbenzocyclobutane, 1,4-hexadiene, 1,7octadiene, and cycloalkenes, e.g., cyclopentene, cyclohexene and cyclooctene. Thus, ethylene interpolymers within the purview of the present invention include, for example, but are not limited to, ethylene/propylene interpolymers, ethylene/1-butene interpolymers, ethylene/1-pentene interpolymers, ethylene/1-hexene interpolymers, ethylene/1-octene interpolymers and ethylene/ styrene interpolymers.

Additives, such as antioxidants (e.g., hindered phenolics, such as IRGANOX™ 1010 or IRGANOX™ 1076 supplied by Ciba Geigy), phosphites (e.g., IRGAFOS™ 168 also supplied by Ciba Geigy), cling additives (e.g., PIB), SANDOSTAB PEPQ™ (supplied by Sandoz), pigments, colorants, fillers, anti-stats, processing aids, and the like may also be included in the novel composition or fabricated article. Although generally not required, films, coatings and moldings formed from the novel composition may also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, may also be added to enhance the antistatic characteristics of films, coatings and moldings formed from the novel composition and permit the use of the composition in, for example, the heavy-duty packaging of electronically sensitive goods.

The fabricated articles of the invention (such as, for example, but not limited to, a film, film layer, fiber, molding, sheet, pouch, bag, sack, tube and coating) may further include recycled and scrap materials and diluent polymers to provide, for example, multi-polymer blends to the extent that the desired property balanced is maintained. Exemplary diluent materials include, for example, elastomers (e.g., EPDM, EPR, styrene butadiene block polymer such as styrene-isoprene-styrene, styrene-butadiene, styrene-butadiene-styrene, styrene-ethylene-styrene and styrene-propylene-styrene), natural and synthetic rubbers and anhydride modified polyethylenes (e.g., polybutylene and maleic anhydride grafted LLDPE and HDPE), high density polyethylene (HDPE), medium density polyethylene (MDPE), heterogeneously branched ethylene polymers (e.g., ultra or very low density polyethylene and linear low density polyethylene) and homogeneously branched ethylene polymers (e.g., substantially linear ethylene polymers) as well as with high pressure polyethylenes such as, for example, low density polyethylene (LDPE), ethylene/acrylic acid (EAA) interpolymers, ethylene/vinyl acetate (EVA) interpolymers and ethylene/methacrylate (EMA) interpolymers, and combinations thereof.

The fabricated article of the invention may find utility in a variety of applications. Suitable applications are thought to include, for example, but are not limited to, monolayer packaging films; multilayer packaging structures consisting of other materials such as, for example, biaxially oriented polypropylene or biaxially oriented ethylene polymer for shrink film and barrier shrink applications; packages formed via form/fill/seal machinery; peelable seal packaging structures; cook-in food packages; compression filled packages; heat seal films and packages for food packaging, snacks, grains, cereals, cheeses, frozen poultry and frozen produce; cast stretch films; monolayer shrink film; heat sealable stretch wrap packaging film; ice bags; foams; molded articles; bag-n-box; fresh cut produce packaging; fresh red meat retail packaging; liners and bags such as, for example, cereal liners, grocery/shopping bags, and especially heavy-duty shipping sacks and trash can liners (bags) where higher levels of downgauging are now possible due to the improved toughness properties exhibited by the fabricated article of the invention.

The fabricated article of the invention can be prepared by any convenient method known in the art. Suitable methods include, for example, lamination and coextrusion techniques or combinations thereof; blown film; cast film; extrusion coating; injection molding; blow molding; thermoforming; profile extrusion, pultrusion; calendering; roll milling; compression molding; rotomolding; injection blow molding; and fiber spinning and combinations thereof and the like. Preferably, however, the novel composition is fabricated into a blown film for such uses as packaging, liner, bag or lamination applications, especially laminating films.

The fabricated article of the invention can be of any thickness required or desired for the intended end-use application. In particular, the novel film of the invention can be of any suitable film thickness, however, practitioners will appreciate the significant downgauging may be possible due to the high, balanced toughness properties of the novel film. For example, heavy duty shipping sacks typically have film thicknesses greater than 3 mils, especially greater than 7 mils.

EXAMPLES

The following examples are provided for the purpose of explanation and are not intended to limit the present invention in any way.

In an evaluation to investigate the comparative toughness and optical properties of various ethylene interpolymer compositions, several ethylene/1-octene copolymers were obtained. For this investigation, Inventive Examples 1, 2 and 6 and comparative examples 5 and 7 were manufactured using a non-adiabatic, continuous solution polymerization system consisting of two recirculating loop reactors configured in series. The process conditions employed in the manufacturing of Inventive Example 1 are provided in Table 1. Process conditions similar to those employed for Inventive Example 1 were also employed in the manufacture of Inventive Examples 2 and 6. The process conditions for comparative examples 5 and 7 were also similar to those employed for Inventive Example 1, except make-up comonomer was feed to the first loop reactor for the comparative examples. It is surprising that this process difference provides an optimized composition distribution for the inventive examples since the second reactor provides the higher density polymer component of the inventive examples. That is, the comonomer incorporation does not lower the polymer density as ordinarily expected, but instead provides an optimized compositional distribution that results in balanced toughness properties and improved optical properties.

Comparative examples 3, 4 and 8 were manufactured in a single recirculating loop reactor. For comparative examples 3 and 8, a conventional Ziegler-Natta catalyst system was employed under continuous solution polymerization conditions. Comparative example 4, was manufactured using a constrained geometry catalyst system according to methods and procedures described U.S. Pat. No. 5,272,236; U.S. Pat. No. 5,278,272; and U.S. Pat. No. 5,665,800.

TABLE 1

|  | Inv. Ex 1 | |
| --- | --- | --- |
|  | Flow Loop Rx1 | Flow Loop Rx2 |
| Process Temperature, °C. | 121 | 200 |
| Process Pressure, psig | 535 | 535 |
| Polymer Concentration wt. % | 16.6 | 21.9 |
| $C_2$ Conversion, % (overall) | 77.5 | 86.1 (92.2) |
| Solvent/$C_2$ feed ratio | 4.5 | 2.8 |
| Solvent flow, lbs./hr | 653 | 316 |
| $C_2$ flow, lbs./hr | 145 | 113 |
| Make-up $C_8$ flow lbs./hr | 0 | 24 |
| Fresh Hydrogen flow, sccm | ~1000 | ~2000 |
| Feed Temp., °C. | 15 | 15 |
| Recycle Ratio | 17 | 10 |
| Polymer split, weight % | 49.2 | 50.8 |
| Residence time, min | 19 | 10 |
| Catalyst Type | Constrained Geometry Catalyst system | Heterogeneous Ziegler-Natta Titanium coordination catalyst system |
| Catalyst efficiency, MM lbs. product/lb. Titanium | 2.0 | 0.3 |
| Volumetric Heat Removal rate, BTU/hr*$ft^3$*°F. | 400 | 630 |
| Production rate, lbs./hr. (overall) | 132 | 137 (269) |

Table 2 provides the physical properties of Inventive Examples 1 and 2 and comparative examples 3, 4 and 5.

TABLE 2

| Property | Inv. Ex. 1 | Inv. Ex. 2 | Comp. Ex. 3† | Comp. Ex. 4† | Comp. Ex. 5† |
| --- | --- | --- | --- | --- | --- |
| Melt Index, $I_2$, g/10 min | 0.8 | 0.5 | 1.0 | 1.03 | 0.85 |
| $I_{10}/I_2$ | 7.4 | 7.2 | 7.8 | 9.96 | 7.4 |
| Composition Density g/cc | 0.921 | 0.921 | 0.920 | 0.918 | 0.920 |
| GPC $M_w$ | 133,500 | 145,500 | 130,700 | 80,400 | 116,800 |
| GPC $M_n$ | 47,100 | 49,700 | 34,300 | 38,467 | 34,900 |
| $M_w/M_n$ | 2.83 | 2.93 | 3.81 | 2.09 | 3.35 |
| ATREF $T_{peak1}$, °C. | 81.5 | 82 | 85 | 82.5 | 72 |

TABLE 2-continued

| Property | Inv. Ex. 1 | Inv. Ex. 2 | Comp. Ex. 3† | Comp. Ex. 4† | Comp. Ex. 5† |
|---|---|---|---|---|---|
| ATREF $M_{v1}$ | 94,400 | 118,900 | 100,000 | 97,724 | 158,500 |
| ATREF $T_{peak2}$, °C. | 98 | 98 | 98 | None | 98 |
| ATREF $M_{v2}$ | 158,500 | 167,900 | 149,600 | NA | 102,330 |
| ATREF High Density Fraction % | 14 | 22.2 | 15.9 | 0.5 | 20 |
| $M_{v1}/M_{v2}$ | 0.60 | 0.71 | 0.67 | NA | 1.55 |
| $T_{peak2}-T_{peak1}$, °C. | 16.5 | 16 | 13 | NA | 26 |
| First Reactor Polymer Split, % | 49.2 | 51.8 | NA | NA | 36.8 |
| *1st Reactor Polymer Density, g/cc | 0.913 | 0.910 | NA | NA | 0.902 |
| *1st Reactor Polymer $I_2$, g/10 min. | 1.0 | 0.38 | NA | NA | 0.19 |
| *1st Reactor Polymer $M_w$ | 97,400 | 127,900 | NA | NA | 158,300 |
| *1st Reactor Polymer LCB/10000 C. | 0.13 | 0.08 | NA | NA | 0.044 |
| 2nd Reactor Polymer Density, g/cc | 0.929 | 0.933 | NA | NA | 0.931 |
| *2nd Reactor Polymer $I_2$, g/10 min | 0.4 | 0.6 | NA | NA | 2.4 |
| *2nd Reactor Polymer $M_w$ | 149,700 | 135,900 | NA | NA | 92,635 |
| 1st $M_w$/2nd $M_w$ | 0.65 | 0.94 | NA | NA | 1.71 |
| Density Differential (2nd-1st) | 0.016 | 0.023 | NA | NA | 0.029 |

†Comparative example provided for purposes of comparison only; not an example of the present invention.
*Value predicted based on a kinetic model although a mass balance model would also suffice where direct measurement is not convenient.

Nominal 50 mm blown film was fabricated from Inventive Example 1 and 2 and comparative compositions 3, 4 and 5 on an Egan blown film unit equipped with 2 inch diameter, 32:1 L/D extruder and a 3 inch annular die. The blown film extrusion conditions for each example is provided in Table 3.

TABLE 3

| Example | Inv. Ex 1 | Inv. Ex 2 | Comp. Ex 3† | Comp. Ex 4† | Comp. Ex 5† |
|---|---|---|---|---|---|
| Die Gap, mils | 35 | 35 | 35 | 35 | 35 |
| Melt Temperature, °F. | 453 | 462 | 450 | 450 | 450 |
| Die Pressure, psi | 5,870 | 6,210 | 5,040 | 3,270 | 5,430 |
| Output, lbs./hr. | 120 | 90 | 120 | >120* | 120 |
| Extruder Amperage | 93 | 86 | 80 | 65 | 83 |
| Blow-Up Ratio | 2.7:1 | 2.7:1 | 2.7:1 | 2.7:1 | 2.7:1 |

†Comparative example provided for purposes of comparison only; not an example of the present invention.
*Value is an estimate, not an actual measurement.

During the actual blown film fabrication, all of the examples exhibited good bubble stability. However, surprisingly, although Inventive Examples 1 and 2 are characterized by substantially higher molecular weights and narrower molecular weight distributions relative to comparative example 3, the inventive examples exhibited comparable extrusion processibility; that is, the extrusion amperage for the inventive examples was only about 8 to about 16 percent higher than that for comparative example 3. This result is unexpected and surprising because typically narrower molecular weight distributions and higher molecular weights are both well-known contribute to poor processability characteristics.

Table 4 lists film performance properties for Inventive Examples 1 and 2 and comparative examples 3,4 and 5.

TABLE 4

| Example | Inv. Ex 1 | Inv. Ex 2 | Comp. Ex 3† | Comp. Ex 4† | Comp. Ex 5† |
|---|---|---|---|---|---|
| Dart Impact (Method B), g | 530 | 760 | 236 | 324 | 800 |
| Elmendorf Type A - MD g | 570 | 538 | 691 | 526 | 510 |
| Elmendorf Type A - CD g | 701 | 579 | 819 | 768 | 725 |
| Elmendorf MD/CD | 0.81 | 0.93 | 0.84 | 0.68 | 0.70 |
| Ultimate Tensile - MD psi | 7,340 | 8,189 | 6,525 | 6,787 | 6,700 |
| Ultimate Tensile - CD psi | 7,706 | 7,572 | 5,480 | 6,139 | 6,350 |
| Ultimate Tensile MD/CD | 0.95 | 1.08 | 1.19 | 1.11 | 1.06 |
| Percent Film Haze | 8.27 | 8.25 | 11.0 | 8.30 | 11.5 |

Elmendorf tear resistance was determined in accordance with ASTM D1922.
Ultimate tensile was determined in accordance with ASTM D638.
Percent film haze was determined in accordance with ASTM D1003.

TABLE 4-continued

| Example | Inv. Ex 1 | Inv. Ex 2 | Comp. Ex 3† | Comp. Ex 4† | Comp. Ex 5† |
|---|---|---|---|---|---|

†Comparative example provided for purposes of comparison only; not an example of the present invention.

Table 4 indicates that Inventive Examples 1 and 2 exhibit an excellent balance of performance properties. The inventive examples are characterized by balanced tear resistance, high and balanced ultimate tensile strength, high dart impact resistance and reduced film haze. By "balanced tear resistance" it is meant that the ratio of MD tear to CD tear is in the range of from about 0.8 to about 1. By "balanced ultimate tensile strength" it is meant that the ratio of MD ultimate tensile strength to CD ultimate tensile strength is in the range of from about 0.9 to about 1.1. By "high dart impact resistance" it is meant that at a 0.908 g/cc density and 0.5 $I_2$, impact resistance would be $\geq$750 grams; at a 0.920 g/cc density and 0.5 $I_2 \geq$500 grams; and at a 0.926 g/cc density and 0.5 $I_2 \geq$250 grams. More particularly, since dart impact resistance is recognized to vary with density and melt index, high dart impact resistance is defined as a dart impact resistance (as determined in accordance with Method B) equal to or greater than the product of the equation: dart impact resistance=2181621.3×den−1203704.2×den$^2$−273.7×Log$I_2$−987852.9 where den is composition density (in g/cm$^3$); den$^2$ is composition density squared and $I_2$ is melt index in accordance with ASTM D-1238, Condition 190° C./2.16 kg.

Surprisingly, the inventive examples exhibit reduced film haze even though they are characterized by higher molecular weight and larger ATREF temperature differential than comparative example 3. Even more surprisingly, Table 3 indicates that the film haze of the inventive examples is unexpectedly equivalent to comparative example 4 which is a homogeneously branched substantially linear ethylene polymer which characterized by a more uniform compositional distribution, no high density polymer fraction, lower molecular weight and narrower molecular weight distribution, which are characteristics that are well-known to confer to improved optical properties.

In a second evaluation, polymer compositions having a nominal 0.926 g/cc composition density were compared. Table 5 shows the physical properties of the polymer compositions (Inventive Example 6 and comparative examples 7 and 8).

TABLE 5

| Property | Inv. Ex. 6 | Comp. Ex. 7† | Comp. Ex. 8† |
|---|---|---|---|
| Melt Index, $I_2$, g/10 min | 0.5 | 0.85 | 1.04 |
| $I_{10}/I_2$ | 7.2 | 7.4 | 8.06 |
| Composition Density, g/cc | 0.926 | 0.926 | 0.9278 |
| GPC $M_w$ | 147,900 | 119,900 | 115,000‡ |
| GPC $M_n$ | 52,100 | 35,900 | 31,080‡ |
| $M_w/M_n$ | 2.84 | 3.34 | 3.7 |
| ATREF $T_{peak1}$, ° C. | 87.5 | 75 | 87.5 |
| ATREF $M_{v1}$ | 118,900 | 149,600 | 100,000‡ |
| ATREF $T_{peak2}$, ° C. | 98 | 98 | 97 |
| ATREF $M_{v2}$ | 166,000 | 100,00 | 150,000‡ |
| ATREF High Density Fraction, % | 27.1 | 45.9 | 25.0 |
| $M_{v1}/M_{v2}$ | 0.72 | 1.5 | 0.67 |
| $T_{peak2}-T_{peak1}$, ° C. | 10.5 | 23 | 9.5 |
| First Reactor Polymer Split, % | 50.7 | 39.5 | NA |
| *1st Reactor Polymer Density, g/cc | 0.918 | 0.906 | NA |
| *1st Reactor Polymer $I_2$, g/10 min | 0.35 | 0.17 | NA |
| *1st Reactor Polymer $M_w$ | 126,700 | 161,200 | NA |
| *1st Reactor Polymer LCB/10000C | 0.09 | 0.076 | NA |
| *2nd Reactor Polymer Density, g/cc | 0.934 | 0.939 | NA |
| *2nd Reactor Polymer $I_2$, g/10 min | 0.6 | 2.3 | NA |
| *2nd Reactor Polymer $M_w$ | 133,400 | 92,936 | NA |
| 1st $M_w$/2nd $M_w$ | 0.95 | 1.73 | NA |
| Density Differential (2nd-1st) | 0.016 | 0.033 | NA |

†Comparative example provided for purposes of comparison only; not an example of the present invention.
*Value predicted based on a kinetic model.
‡Typical value.

Nominal 50 mm blown film was fabricated from Inventive Example 1 and 2 and comparative compositions 3, 4 and 5 on an Egan blown film unit equipped with 2 inch diameter, 32:1 L/D extruder and a 3 inch annular die. The blown film extrusion conditions for each example is provided in Table 6.

TABLE 6

| Example | Inv. Ex 6 | Comp. Ex 7† | Comp. Ex 8† |
|---|---|---|---|
| Die Gap, mils | 35 | 35 | 35 |
| Melt Temperature, ° F. | 460 | 468 | 462 |
| Die Pressure, psi | 6,280 | 6,170 | 5,160 |
| Output, lbs./hr. | 90 | 120 | 120 |
| Extruder Amperage | 85 | 81 | 71 |
| Blow-Up Ratio | 2.7:1 | 2.7:1 | 2.7:1 |

†Comparative example provided for purposes of comparison only; not an example of the present invention.

During the actual blown film fabrication, all of the examples exhibited good bubble stability. Table 7 lists film performance properties for Inventive Example 6 and comparative examples 7 and 8. Surprisingly, during blown film fabrication, Inventive Example 6 exhibited fair processability (nominal amperage) even though the novel composition was characterized by a substantially higher molecular weight and a narrower molecular weight distribution relative to comparative examples 7 and 8.

TABLE 7

| Example | Inv. Ex 6 | Comp. Ex 7† | Comp. Ex 8† |
|---|---|---|---|
| Dart Impact (Method B), g | 250 | 410 | 177 |
| Elmendorf Type A - MD | 570 | 456 | 477 |
| Elmendorf Type A - CD | 627 | 803 | 718 |
| Elmendorf MD/CD | 0.91 | 0.57 | 0.66 |
| Ultimate Tensile - MD, psi | 6,785 | 6,820 | 6,975 |
| Ultimate Tensile - CD, psi | 6,856 | 7,006 | 4,800 |
| Ultimate Tensile MD/CD | 0.99 | 0.97 | 1.45 |
| Percent Film Haze | 10.27 | 14.0 | 12.0 |

Elmendorf tear resistance was determined in accordance with ASTM D1922.
Ultimate tensile was determined in accordance with ASTM D638.
Percent film haze was determined in accordance with ASTM D1003.
†Comparative example provided for purposes of comparison only; not an example of the present invention.

Table 7 indicates that Inventive Example 6 exhibits an excellent property balance. Relative to both comparative example 7 and 8, Inventive Example 6 exhibited superior tear resistance balance (cf. 0.91 versus 0.66 and 0.57). Also, the inventive example had superior tensile strength balance relative to comparative example 8 which is a heterogeneously branched ethylene/1-octene copolymer manufactured as described above with a Ziegler-Natta catalyst system.

Additionally, similar to the results shown for Inventive Examples 1 and 2, Table 7 indicates that Inventive Example 6 also exhibits surprisingly improved optical properties. The percent film haze of Inventive Example 6 was lower that the comparative examples 7 and 8 even though the inventive example possessed are substantially higher molecular weight as indicated by $I_2$ melt index values.

In another evaluation designed to further investigate the requirements for improved processability, good optical properties and improved toughness, several inventive examples and comparative examples were prepared. Table 8 provides the physical properties for the various polymer compositions which all have a nominal 0.921 g/cm$^3$ composition density.

Inventive Examples 9 and 10 and comparative examples 11 and 12 were all prepared using a process system and conditions similar to Inventive Example 1 (i.e. a constrained geometry catalyst system was feed to the first reactor of a two-reactor polymerization system and a conventional Ziegler catalyst system was feed to the second reactor). Comparative example 13 was made in a single reactor polymerization system under continuous solution polymerization conditions using a Ziegler-Natta MgCl$_2$ supported Titanium catalyst system having a high Mg:Ti molar ratio and a high Mg surface area. Table 9 provides the performance properties for the Inventive Examples 9 and 10 and comparative examples 11–13 as compared to Inventive Example 1 and comparative examples 3 and 5.

TABLE 8

| Property | Inv. Ex 9 | Inv. Ex 10 | Comp. Ex 11† | Comp. Ex 12† | Comp. Ex 13† |
|---|---|---|---|---|---|
| Melt index, $I_2$, g/10 min. | 0.87 | 0.76 | 0.83 | 0.8 | 1.02 |
| $I_{10}/I_2$ | 7.6 | 6.9 | 8.1 | 8.8 | 7.6 |
| Composition Density, g/cc | 0.9204 | 0.921 | 0.9219 | 0.9221 | 0.9201 |
| GPC Mw | 125,000 | 123,000 | 132,300 | 115,600 | 125,400 |
| GPC Mn | 49,400 | 44,600 | 35,400 | 23,000 | 35,800 |
| Mw/Mn | 2.53 | 2.76 | 3.74 | 5.03 | 3.50 |
| ATREF Tpeak$_1$, C | 86 | 86 | 86 | 89 | 85 |
| ATREF M$_{v1}$ | 89,500 | 99,900 | 137,000 | 191,000 | 89,900 |
| ATREF Tpeak$_2$, C | 99 | 99 | 99 | 99 | 98 |
| ATREF M$_{v2}$ | 104,000 | 101,000 | 59,000 | 89,300 | 129,000 |
| ATREF High Density Fraction, % | 15.3 | 15.5 | 9.4 | 8.4 | 12.4 |
| M$_{v1}$/M$_{v2}$ | 0.86 | 0.99 | 2.32 | 2.14 | 0.70 |
| Tpeak$_2$-Tpeak$_1$,° C. | 13 | 13 | 13 | 10 | 13 |
| First Reactor Polymer Split, % | 51 | 50 | 56 | 52 | NA |
| *1st Reactor Polymer Density, g/cc | 0.913 | 0.913 | 0.913 | 0.910 | NA |
| *1st Reactor Polymer $I_2$, g/10 min. | 0.6 | 0.4 | 0.2 | 0.2 | NA |
| *1st Reactor Polymer Mw | 112,100 | 125,500 | 143,400 | 149,300 | NA |
| *1st Reactor Polymer LCB/10,000 C | 0.20 | 0.09 | 0.08 | 0.09 | NA |
| *2nd Reactor Polymer Density, g/cc | 0.928 | 0.929 | 0.934 | 0.935 | NA |
| *2nd Reactor Polymer $I_2$, g/10 min. | 0.9 | 1.3 | 25 | 21 | NA |
| *2nd Reactor Polymer Mw | 120,100 | 109,000 | 48,900 | 51,300 | NA |
| 1st Mw/2nd Mw | 0.93 | 1.15 | 2.93 | 2.91 | NA |

TABLE 8-continued

| Property | Inv. Ex 9 | Inv. Ex 10 | Comp. Ex 11† | Comp. Ex 12† | Comp. Ex 13† |
|---|---|---|---|---|---|
| Density Differential (2nd-1st) | 0.015 | 0.015 | 0.021 | 0.025 | NA |

†Comparative example provided for purposes of comparison only: not an example of the present invention.
*Value predicted based on a kinetic model.

TABLE 9

| Property | Inv. Ex 1 | In. Ex 9 | Inv. Ex 10 | Comp. Ex 11† | Comp. Ex 12† | Comp. Ex 13† | Comp. Ex 3† | Comp. Ex 5† |
|---|---|---|---|---|---|---|---|---|
| Melt Index, $I_2$, (g/10 min.) | 0.80 | 0.84 | 0.76 | 0.83 | 0.80 | 1.02 | 0.95 | 0.86 |
| Composition Density (g/cc) | 0.921 | 0.920 | 0.921 | 0.922 | 0.922 | 0.920 | 0.920 | 0.920 |
| $I_{10}/I_2$ | 7.48 | 7.53 | 6.90 | 8.09 | 8.81 | 7.58 | 7.90 | 7.57 |
| $M_w/M_n$ | 2.94 | 2.53 | 2.76 | 5.10 | 5.03 | 3.50 | 3.87 | 3.34 |
| Vicat Softening Point (° C.) | 107.5 | 108.0 | 108.8 | 106.7 | 104.7 | 104.2 | 105.1 | 105.8 |
| Extruder Amps | 94 | 88 | 94 | 76 | 66 | 78 | 80 | 86 |
| Extruder Die Pressure (psi) | 6150 | 5780 | 6030 | 4860 | 4230 | 4600 | 4840 | 5320 |
| Avg Haze Value, % | 7.4 | 7.6 | 7.3 | 11.6 | 13.7 | 7.9 | 10.8 | 10.5 |
| DART (Method B), grams | 544 | 472 | 550 | 452 | 250 | 274 | 266 | 646 |
| Avg Elmendorf Type A CD, gms | 806 | 909 | 802 | 758 | 765 | 702 | 885 | 862 |
| Avg Elmendorf Type A MD, gms | 550 | 544 | 562 | 480 | 512 | 883 | 626 | 467 |
| Type A MD/CD | 0.68 | 0.60 | 0.70 | 0.63 | 0.67 | 1.26 | 0.71 | 0.54 |
| Avg Elmendorf Type B CD, gms | 1102 | 1139 | 1056 | 1091 | 1235 | 1165 | 1082 | 960 |
| Avg Elmendorf Type B MD, gms | 754 | 718 | 747 | 674 | 667 | 877 | 781 | 598 |
| Type B MD/CD | 0.68 | 0.63 | 0.71 | 0.62 | 0.54 | 0.75 | 0.72 | 0.62 |
| CD-Avg Ultimate Tensiles, psi | 5885 | 6550 | 6630 | 6191 | 5013 | 5657 | 4978 | 5810 |
| MD-Avg Ultimate Tensiles, psi | 6383 | 7223 | 6791 | 6872 | 5972 | 7207 | 6289 | 7065 |
| Ultimate Tensiles MD/CD | 1.08 | 1.10 | 1.02 | 1.11 | 1.19 | 1.27 | 1.26 | 1.22 |
| HSIT, ° C. | ~101 | ~102 | ~101 | ~105 | ~110 | ~101 | ~100 | ~100 |
| HTIT, ° C. | ~102 | ~103 | ~102 | ~110 | ~116 | ~103 | ~101 | ~101 |

Note: 2 mil blown film. HSIT denotes heat seal initiation temperature. HTIT denotes hot tack initiation temperature.
†Comparative example provided for purposes of comparison only; not an example of the present invention.

The data in Table 9 indicates that Inventive Example 9 exhibits improved processability with improved optical properties while maintaining a high dart impact resistance. Comparative examples 11 and 12 which are two-component (polymer) compositions show improved processability; however, their optical properties were objection and their sealing properties were poor (i.e. characterized as having initiation temperatures higher than their Vicat Softening Point temperatures) rendering they inferior choices for use in, for example, laminating film applications.

In another evaluation, compositions with densities in the range of from about 0.91 to about 0.918 g/cm$^3$ were investigated. Table 10 provides the physical properties for these compositions.

Inventive Example 14 and comparative examples 17–20 were all made using a process system and conditions similar to Inventive Example 1. Comparative examples 17–20 are cast film compositions made in accordance with the teachings in WO 97/26000 and are sold as developmental products by The Dow Chemical Company. Comparative examples 15 and 16 were both made in a single reactor polymerization system under continuous solution polymerization conditions. Comparative example 15 was made using a conventional TiCl Ziegler Natta catalyst system and comparative example 16 was made using a constrained geometry catalyst system as described in U.S. Pat. Nos. 5,272,236; 5,278,272; and 5,665,800.

Table 11 provides the performance properties for three of the compositions, Inventive Example 14 and comparative examples 15 and 16. Table 11 shows that relative to comparative example 16, Inventive Example 14 exhibits improved toughness balance with good optical properties and heat sealability. Relative to comparative example 15, Table 11 also shows that Inventive Example 14 exhibits comparable property balance with significantly improved impact resistance, optics and heat sealability. Further, it is contemplated that the processability of the Inventive Example 14 can be efficiently improved by increasing its long chain branching content while maintaining its other key improvement as exemplified or embodied, for example, in Inventive Example 9.

TABLE 10

| Property | Inv. Ex 14 | Comp. Ex 15† | Comp. Ex 16† | Comp. Ex 17† | Comp. Ex 18† | Comp. Ex 19† | Comp. Ex 20† |
|---|---|---|---|---|---|---|---|
| Melt index, $I_2$, g/10 min. | 0.86 | 0.97 | 0.96 | 2.3 | 5 | 3.5 | 4 |
| $I_{10}/I_2$ | | 7.1 | 8.2 | 10.4 | 6.6 | 6.6 | 6.6 | 6.6 |
| Composition Density, g/cc | 0.9101 | 0.9126 | 0.9104 | 0.917 | 0.918 | 0.915 | 0.916 |

TABLE 10-continued

| Property | Inv. Ex 14 | Comp. Ex 15† | Comp. Ex 16† | Comp. Ex 17† | Comp. Ex 18† | Comp. Ex 19† | Comp. Ex 20† |
|---|---|---|---|---|---|---|---|
| GPC Mw | 120,600 | 116,600 | 86,100 | 95,900 | 75,600 | 81,400 | ND |
| GPC Mn | 43,500 | 31,200 | 38,000 | 37,700 | 27,700 | 33,600 | ND |
| Mw/Mn | 2.77 | 3.74 | 2.27 | 2.54 | 2.73 | 2.42 | <3.3** |
| ATREF $T_{peak1}$, °C | 74 | 76.5 | 78 | 78 | 79 | 76 | 75 |
| ATREF $M_{v1}$ | 109,000 | 74,500 | 65,800 | 78,300 | 86,900 | 64,400 | 53,700 |
| ATREF $T_{peak2}$, °C | 99 | 99 | None | 99 | 99 | 99 | 99 |
| ATREF $M_{v2}$ | 142,000 | 140,000 | NA | 109,000 | 86,100 | 98,600 | 69,200 |
| ATREF High Density Fraction, % | 10.7 | 10.6 | 0 | 14.7 | 10.3 | 12.6 | 12.2 |
| $M_{v1}/M_{v2}$ | 0.77 | 0.53 | NA | 0.72 | 1.01 | 0.65 | 0.78 |
| $T_{peak2} - T_{peak1}$, °C | 25 | 22.5 | NA | 21 | 20 | 23 | 24 |
| First Reactor Polymer Split, % | 51 | NA | NA | 51 | 51 | 51 | 51 |
| *1st Reactor Polymer Density, g/cc | 0.900 | NA | NA | 0.911 | 0.912 | 0.909 | 0.9096 |
| *1st Reactor Polymer $I_2$, g/10 min. | 0.3 | NA | NA | 1 | 2.2 | 1.8 | 1.9 |
| *1st Reactor Polymer $M_w$ | 141,400 | NA | NA | 98,600 | 80,600 | 86,100 | ND |
| *1st Reactor Polymer LCB/10,000 C | 0.05 |  | NA | 0.077 | 0.077 | 0.077 | ND |
| *2nd Reactor Polymer Density, g/cc | 0.921 | NA | NA | 0.923 | 0.924 | 0.921 | 0.9225 |
| *2nd Reactor Polymer $I_2$, g/10 min. | 5 | NA | NA | 2.9 | 65 | 4 | 5 |
| *2nd Reactor Polymer $M_w$ | 76,000 | NA | NA | 87,900 | 70,400 | 80,300 | ND |
| 1st $M_w$/2nd $M_w$ | 1.86 | NA | NA | 1.12 | 1.14 | 1.07 | ND |
| Density Differential (2nd − 1st) | 0.021 | NA | NA | 0.012 | 0.012 | 0.012 | 0.0129 |

†Comparative example provided for purposes of comparison only; not an example of the present invention.
*Value predicted based on a kinetic model.
**Value is an estimate, not an actual measurement.

TABLE 11

| Performance Properties | Inv. Ex 14 | Comp. Ex 15† | Comp. Ex 16† |
|---|---|---|---|
| Melt Index, $I_2$, (g/10 min) | 0.86 | 0.97 | 0.96 |
| Composition Density (g/cc) | 0.910 | 0.913 | 0.910 |
| $I_{10}/I_2$ | 7.08 | 8.16 | 10.35 |
| Vicat Soft. Pt. (°C.) | 94.7 | 94.1 | 96.7 |
| Extruder Amps | 97 | 75 | 73 |
| Extruder Die Pressure (psi) | 5360 | 4430 | 3820 |
| Avg Haze Value, % | 3.8 | 7.1 | 2.4 |
| Dart B, g | >850 | 610 | >850 |
| Modified Dart, g | >1470 | 776 | 1297 |
| Avg Elmendorf Type A CD, g | 822 | 904 | 685 |
| Avg Elmendorf Type A MD, g | 621 | 715 | 408 |
| Type A MD/CD | 0.75 | 0.79 | 0.60 |
| Avg Elmendorf Type B CD, g | 858 | 992 | 821 |
| Avg Elmendorf Type B MD, g | 621 | 862 | 477 |
| Type B MD/CD | 0.72 | 0.87 | 0.58 |
| CD-Avg Ultimate Tensiles, psi | 8163 | 6322 | ND |
| MD-Avg Ultimate Tensiles, psi | 6676 | 4731 | ND |
| Ultimate Tensiles MD/CD | 0.82 | 0.75 | ND |
| HSIT, °C. | ~82–83 | ~92–93 | ~82–83 |
| HTIT, °C. | ~90 | ~110 | ~93 |

Note:
2 mil blown film. HSIT denotes heat seal initiation temperature.
HTIT denotes hot tack initiation temperature.

†Comparative example provided for purposes of comparison only: not an example of the present invention.

In another evaluation, compositions with densities in the range of from about 0.929 to about 0.941 g/cm³ were investigated. Table 12 provides the physical properties for these compositions and Table 13 provides the performance properties for the compositions. Inventive Examples 22–24 and comparative example 27 were all made using a process system and polymerization conditions similar to the employed for Inventive Example 1. Comparative examples 25 and 26 were made using a single reactor system under continuous solution polymerization conditions. Comparative example 25 was made using a conventional TiCl Ziegler Natta catalyst system. Comparative example 26 was made using a Ziegler-Natta $MgCl_2$ supported Titanium catalyst system having a high Mg:Ti molar ratio and a high Mg surface area.

TABLE 12

| Property | Inv. Ex 22 | Inv. Ex 23 | Comp. Ex 24 | Comp. Ex 25 | Comp. Ex 26 | Comp. Ex 27 |
|---|---|---|---|---|---|---|
| Melt index, $I_2$, g/10 min. | 0.79 | 0.94 | 0.67 | 1.03 | 0.81 | 2.3 |
| $I_{10}/I_2$ | 7.5 | 7.1 | 8.2 | 7.8 | 8.2 | 7.4 |
| Composition Density, g/cc | 0.9295 | 0.9305 | 0.9328 | 0.9304 | 0.9305 | 0.9409 |
| GPC $M_w$ | 125,100 | 128,100 | 127,600 | 120,200 | 116,300 | 92,100 |
| GPC $M_n$ | 46,700 | 43,000 | 25,800 | 33,100 | 27,400 | 35,100 |
| $M_w/M_n$ | 2.68 | 2.98 | 4.95 | 3.63 | 4.24 | 2.62 |
| ATREF $T_{peak1}$, °C. | 90 | 94 | 94 | 92 | 94 | 89 |
| ATREF $M_{v1}$ | 86,400 | 144,000 | 141,000 | 120,000 | 91,100 | 79,400 |
| ATREF $T_{peak2}$, °C. | 99 | None | None | 97 | 98 | 100 |
| ATREF $M_{v2}$ | 97,000 | NA | NA | 157,000 | 110,000 | 75,700 |
| ATREF High Density Fraction, % | 81.3 | 79.7 | 75.6 | 70.7 | 65.8 | 60.3 |
| $M_{v1}/M_{v2}$ | 0.89 | NA | NA | 0.76 | 0.83 | 1.05 |
| $T_{peak2} - T_{peak1}$, °C. | 9 | NA | NA | 5 | 4 | 11 |
| First Reactor Polymer Split, % | 49 | 53 | 59 | NA | NA | 29 |
| *1st Reactor Polymer Density, g/cc | 0.923 | 0.928 | 0.925 | NA | NA | 0.924 |
| *1st Reactor Polymer $I_2$, g/10 min. | 0.5 | 0.5 | 0.25 | NA | NA | 0.8 |
| *1st Reactor Polymer $M_w$ | 111,300 | 109,800 | 134,000 | NA | NA | 96,300 |
| *1st Reactor Polymer LCB/10,000 C | 0.53 | 0.17 | 0.15 | NA | NA | 0.47 |
| *2nd Reactor Polymer Density, g/cc | 0.936 | 0.934 | 0.945 | NA | NA | 0.948 |
| *2nd Reactor Polymer $I_2$, g/10 min. | 0.9 | 1.3 | 60 | NA | NA | 2.6 |
| *2nd Reactor Polymer $M_w$ | 120,000 | 108,200 | 38,500 | NA | NA | 90,000 |
| 1st $M_w$/2nd $M_w$ | 0.93 | 1.01 | 3.48 | NA | NA | 1.07 |
| Density Differential (2nd − 1st) | 0.014 | 0.006 | 0.020 | NA | NA | 0.025 |

†Comparative example provided for purposes of comparison only; not an example of the present invention.
*Value predicted based on a kinetic model.
**Value is an estimate, not an actual measurement.

TABLE 13

| Performance Properties | Inv. Ex 22 | Inv. Ex 23 | Comp. Ex 24† | Comp. Ex 25† |
|---|---|---|---|---|
| Melt Index, $I_2$, (g/10 min) | 0.79 | 0.94 | 0.67 | 1.03 |
| Composition Density (g/cc) | .929 | 0.931 | 0.933 | 0.930 |
| $I_{10}/I_2$ | 7.45 | 7.07 | 8.15 | 7.83 |
| Vicat Softening Point (°C.) | 117.5 | 120.2 | 117.6 | 115.6 |
| $M_w/M_n$ | 2.68 | 2.98 | 4.95 | 3.63 |
| Extruder Amps | 89 | 89 | 82 | 77 |
| Extruder Die Pressure (psi) | 5750 | 5770 | 5490 | 4390 |
| Avg Haze Value, % | 14.2 | 11.5 | 11.6 | 9.6 |
| DART (Method A), grams | 272 | 264 | 272 | 234 |
| DART (Method B), grams | 186 | 152 | 172 | 112 |
| Avg Elmendorf Type A CD, g | 675 | 451 | 610 | 459 |
| Avg Elmendorf Type A MD, g | 294 | 210 | 232 | 254 |
| Type A MD/CD | 0.44 | 0.46 | 0.38 | 0.55 |
| Avg Elmendorf Type B CD, g | 862 | 850 | 738 | 542 |
| Avg Elmendorf Type B MD, g | 336 | 306 | 302 | 270 |
| Type B MD/CD | 0.39 | 0.36 | 0.41 | 0.50 |
| CD-Avg Ultimate Tensiles psi | 6352 | 6173 | 5573 | 5381 |
| MD-Avg Ultimate Tensiles psi | 6545 | 6196 | 6074 | 5872 |
| Ultimate Tensiles MD/CD | 1.03 | 1.00 | 1.09 | 1.09 |
| HSIT, °C. | ~115 | ~115 | ~115 | ~110 |
| HTIT, °C. | ~115 | ~114 | ~117 | ~110 |

Note:
2 mil blown film.
HSIT denotes heat seal initiation temperature.
HTIT denotes hot tack initiation temperature.
†Comparative example provided for purposes of comparison only not an example of the present invention.

The data in Table 13 indicates that, surprisingly, Inventive Examples 22 and 23 provide significantly improved toughness properties, especially relative to comparative example 25, and comparable processability (i.e. similar amperage and die pressure) although their molecular weight distributions are substantially narrower than the comparative examples.

We claim:

1. A polymer composition comprising ethylene interpolymerized with at least one unsaturated comonomer, wherein the composition is characterized as having:

a) a $M_w/M_n$ of less than or equal to 3.3, as determined by gel permeation chromatography (GPC), b) an $I_{10}/I_2$ in the range of from greater than 6.6 to about 8.2, as determined in accordance ASTM D-1238, Condition 190° C./2.16 kg and Condition 190° C./10 kg, c) a composition density less than 0.945 gram/cubic centimeter, as defined according to ASTM-792, d) at least two polymer components, the first component having a first viscosity average molecular weight, $M_{v1}$, and the second component having a second viscosity average molecular, $M_{v2}$, wherein $M_{v1}/M_{v2}$ is less than or equal to 1, as determined using ATREF-DV, and e) a first ATREF peak temperature, $T_{peak1}$ and a second ATREF peak temperature, $T_{peak2}$, corresponding to the at least two components and as determined using analytical temperature rising elution fraction (ATREF), wherein the temperature differential between $T_{peak2}$ and $T_{peak1}$, ΔT, decreases with increased composition density such that ΔT is less than 23° C. at composition densities of greater than or equal to 0.926 g/cm³, greater than 23° C. at composition densities less than or equal to 0.92 g/cm³, and in the range of from about 10 to about 22° C. at composition densities from about 0.92 to about 0.926 g/cm³, wherein the first component polymer is a substantially linear ethylene interpolymer characterized as having:
 i. melt flow ratio, $I_{10}/I_2 \geq 5.63$, and
 ii. a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$ and $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer.

2. A polymer composition comprising ethylene interpolymerized with at least one unsaturated comonomer, wherein the composition is characterized as having:

a) a $M_w/M_n$ of less than or equal to 3.3, as determined by gel permeation chromatography (GPC), b) an $I_{10}/I_2$ ration greater than 6.6, as determined in accordance with ASTM D-1238, Condition 190° C./2.16 kg and Condition 190° C./10 kg, c) a composition density less than 0.945 gram/cubic centimeter, as determined according to ATM-792, d) at least two polymer components, the first component having a first viscosity average molecular weight, $M_{v1}$, and the second component having a viscosity average molecular, $M_{v2}$, wherein $M_{v1}/M_{v2}$ is in the range from about 0.6 to about 1.0, as determined using ATREF-DV, and e) a first ATREF peak temperature, $T_{peak1}$ and a second ATREF peak temperature, $T_{peak2}$, corresponding to the at least two components and as determined using analytical temperature rising elution fraction (ATREF), wherein the temperature differential between $T_{peak2}$ and $T_{peak1}$, ΔT, a ΔT which is equal to or less than the product of the equation:

$$\Delta T - [5650.842 \times \rho^2] - [11334.5 \times \rho] + 5667.93$$

wherein ΔT is in degrees Celsius and ρ is composition density in g/cm³ and wherein the first component is a substantially linear ethylene interpolymer.

3. The composition of claim 1 wherein the at least one unsaturated comonomer is α-olefin selected from the group consisting of propylene, 1-butene, 1-isobutylene, 1-hexene, 4-methyl-1-pentene, 1-pentene, 1-heptene and 1-octene.

4. The composition of claim 1 wherein the $I_{10}/I_2$ ratio is greater than or equal to 7.1, as determined in accordance with ASTM D-1238, Condition 190° C./2.16 kg and Condition 190° C./10 kg.

5. The composition of claim 1 further characterized as having a density differential less than or equal to 0.028 g/cm³, as measured in accordance with ASTM D-792.

6. The composition of claim 1 wherein $M_{v1}/M_{v2}$ is in the, range of from about 0.8 to about 1, as determined using an ATREF-DV technique.

7. The composition of claim 1 further characterized as having greater than or equal to 0.08 long chain branches per 10,000 carbons.

8. The composition of claim 1 wherein the second polymer component is prepared using a homogeneous catalyst system.

9. The composition of claim 8 wherein the homogenous catalyst system is a constrained geometry catalyst system.

10. The composition of claim 1 wherein the second polymer component is prepared using a heterogeneous titanium, vanadium or zirconium catalyst system.

11. The composition of claim 1 wherein the second polymer component is a heterogeneously branched ethylene polymer.

12. The composition of claim 1 wherein the second polymer component is a homogeneously branched linear ethylene polymer.

13. The composition of claim 1 wherein the second polymer component is a substantially linear ethylene polymer is characterized as having:

(a) a molecular weight distribution, $M_w/M_n$ defined by the equation:

$$M_w/M_n \leq (I_{10}/I_2) - 4.63,$$

(b) a melt flow ratio, $I_{10}/I_2 \geq 5.63$, and (c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$ and $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer.

14. The composition of claim 13 wherein the substantially linear ethylene polymer is further characterized as having a single DSC melting point and is an interpolymer of ethylene with at least one $C_3$-$C_{20}$ α-olefin.

15. The composition of claim 1 further characterized as having a high density fraction greater than 15.5 weight percent, based on the total weight of the composition, as determined using a temperature rising elution fractionation technique.

16. The composition of claim 15, wherein the high density fraction is greater than or equal to 22.2 weight percent, based on the total weight of the composition.

* * * * *